US012065762B2

(12) United States Patent
Jung et al.

(10) Patent No.: US 12,065,762 B2
(45) Date of Patent: Aug. 20, 2024

(54) QUAD-POLYMER PRECURSOR FOR PRODUCING CARBON FIBER, METHOD FOR PRODUCING SAME AND METHOD FOR USING SAME

(71) Applicants: Board of Regents, The University of Texas System, Austin, TX (US); Korea Institute of Carbon Convergence Technology, Jeonju-si (KR)

(72) Inventors: Min Hye Jung, Jeonju-si (KR); Hyun Kyu Shin, Changwon-si (KR); Kyu Soon Park, Jeollabuk-do (KR); Duck Joo Yang, Flower Mound, TX (US); Benjamin Batchelor, Dallas, TX (US); Samsuddin Mahmood, Dallas, TX (US)

(73) Assignees: Board of Regents, the University of Texas System, Austin, TX (US); Korea Institute of Carbon Convergence Technology, Jeonju-Si (KR)

( * ) Notice: Subject to any disclaimer, the term of this patent is extended or adjusted under 35 U.S.C. 154(b) by 0 days.

(21) Appl. No.: 18/217,813

(22) Filed: Jul. 3, 2023

(65) Prior Publication Data

US 2023/0357959 A1 Nov. 9, 2023

Related U.S. Application Data

(62) Division of application No. 16/611,214, filed as application No. PCT/KR2018/005300 on May 9, 2018, now Pat. No. 11,692,285.

(Continued)

(51) Int. Cl.
*C08F 220/14* (2006.01)
*C01B 32/05* (2017.01)
(Continued)

(52) U.S. Cl.
CPC ............... *D01F 6/38* (2013.01); *C01B 32/05* (2017.08); *C08F 220/14* (2013.01);
(Continued)

(58) Field of Classification Search
CPC ..... C08F 220/14; C08F 220/44; C08F 220/48
See application file for complete search history.

(56) References Cited

U.S. PATENT DOCUMENTS

2015/0174807 A1\* 6/2015 Tang ................. B29C 48/022
526/225

\* cited by examiner

*Primary Examiner* — Catherine S Branch
(74) *Attorney, Agent, or Firm* — Dickinson Wright PLLC; Ross Spencer Garsson

(57) ABSTRACT

A quad-polymer composition includes monomers of (a) acrylonitrile, (a) vinylimidazole, (c) methyl acrylate and (d) either acrylic acid or itaconic acid. Such quad-polymer compositions may be used to form fibers (such as by melt spinning) that may then be annealed, stabilized, and/or carbonized to produce carbon fibers. The quad-polymer composition may be used for supercapacitors, lithium battery electrodes once carbonized, and as synthesized, it may be used for wound healing fibers, fabrics, coatings, and films, and anti-bacterial/anti-microbial fibers, fabrics, coatings and films. The carbon fibers formed from the quad-polymer composition may be used for the fiber composites for automobile, aerospace structures, marine structures, military equipment/parts, sporting goods, robotics, furniture, and electronic parts.

1 Claim, 20 Drawing Sheets

Related U.S. Application Data

(60) Provisional application No. 62/504,409, filed on May 10, 2017.

(51) Int. Cl.
*C08F 220/44* (2006.01)
*C08F 220/48* (2006.01)
*D01D 5/08* (2006.01)
*D01F 6/38* (2006.01)
*D01F 9/22* (2006.01)
*C08F 220/46* (2006.01)

(52) U.S. Cl.
CPC .......... *C08F 220/44* (2013.01); *C08F 220/48* (2013.01); *D01D 5/08* (2013.01); *D01F 9/22* (2013.01); *C08F 220/46* (2013.01)

QUAD-POLYMER PRECURSOR FOR PRODUCING CARBON FIBER, METHOD FOR PRODUCING SAME AND METHOD FOR USING SAME

CROSS-REFERENCE TO RELATED PATENT APPLICATIONS

This application is a divisional of U.S. patent application Ser. No. 16/611,214, titled "QUAD-POLYMER PRECURSOR FOR PRODUCING CARBON FIBER, METHOD FOR PRODUCING SAME AND METHOD FOR USING SAME," filed Nov. 5, 2019, which is the § 371 National Phase Application of PCT/KR2018/005300, filed May 9, 2018, and claims benefit to U.S. Provisional Patent Application No. 62/504,409, filed May 10, 2017.

TECHNICAL FIELD

The present invention is directed to melt processable carbon fiber precursors that may be used to prepare carbon fibers, and more particularly, an economical (low cost) melt-processable quad-polymer precursors for carbon fibers, a preparation method of the precursors, and preparation methods of the carbon fibers thereof.

BACKGROUND ART

Azarova, M. T., et al., *World production and consumption of carbon fibres*. Fibre Chemistry, 2011. 42(5): p. 271-277 ("Azarova 2011").

Baker, D. A., et al., *Recent advances in low-cost carbon fiber manufacture from lignin*. Journal of Applied Polymer Science, 2013. 130(2): p. 713-728 ("Baker 2013").

Batchelor, B. L., et al., *Plasticization for melt viscosity reduction of melt processable carbon fiber precursor*, Carbon, 2016. 98: 681-688 ("Batchelor 2016").

Bhal, O. P., et al., *Carbon Fibers, Third Edition*, in *Carbon Fibers*, J. B. Donnet, et al., Editors. 1998, Marcel Dekker Inc.: New York. p. 1-84 ("Bhal 1998").

Bhanu, V. A., et al., *Synthesis and characterization of acrylonitrile methyl acrylate statistical copolymers as melt processable carbon fiber precursors*. Polymer, 2002. 43(18): p. 4841-4850 ("Bhanu 2002").

Bortner, M. J., et al., *Shear rheological properties of acrylic copolymers and terpolymers suitable for potentially melt processable carbon fiber precursors*. Journal of Applied Polymer Science, 2004. 93(6): p. 2856-2865 ("Bortner 2004").

Cantwell, W. J., et al., *The impact resistance of composite materials—a review*. Composites, 1991. 22(5): p. 347-362 ("Cantwell 1991").

Chand, S., *Review Carbon fibers for composites*. Journal of Materials Science, 2000. 35(6): p. 1303-1312 ("Chand 2000").

Deng, W., et al., *Poly (Acrylonitrile-co-1-Vinylimidazole): A New Carbon Fiber Precursor: Melt Processable and Thermally Crosslinkable Carbon Fiber Precursor*, 2012: LAP Lambert Academic Publishing ("Deng 2012").

Deng, W., et al., *Poly (acrylonitrile-co-1-vinylimidazole): A new melt processable carbon fiber precursor*. Polymer, 2011. 52(3): p. 622-628 ("Deng 2011").

Deng, W., et al., Polym Prepr (Am Chem Soc Div Polym Chem), 2009. 50: p. 237 ("Deng 2009").

Edie, D. D., *The effect of processing on the structure and properties of carbon fibers* Carbon, 1998. 36(4): p. 345-362 ("Edie 1998").

Eng, F. P., et al., *Fourier transform infrared studies on the thermal degradation of polyvinylimidazoles: Part I*. Journal of Applied Polymer Science, 1986. 32(5): p. 5021-5034 ("Eng 1986").

E.P.A. and D.O.T., 2017 *and later model year light-duty vehicle greenhouse gas emissions and corporate average fuel economy standards*, 2012, Federal Register. p. 62623-63200 ("EPA 2012").

Fu, Z., et al., *Structure evolution and mechanism of polyacrylonitrile and related copolymers during the stabilization*. Journal of Materials Science, 2014. 49(7): p. 2864-2874 ("Fu I 2014").

Fu, Z., et al., *Effects of an itaconic acid comonomer on the structural evolution and thermal behaviors of polyacrylonitrile used for polyacrylonitrile-based carbon fibers*. Journal of Applied Polymer Science, 2014. 131(19): p. n/a-n/a ("Fu II 2014").

Godshall, D., et al., *Incorporation of methyl acrylate in acrylonitrile based copolymers: effects on melting behavior*. Polymer, 2003. 44(15): p. 4221-4228 ("Godshall 2003").

Guigon, M., et al., *Heat-treatment of high tensile strength PAN-based carbon fibres: Microtexture, structure and mechanical properties*. Composites Science and Technology, 1986. 27(1): p. 1-23 ("Guigon 1986").

Jain, M., et al., *Conversion of acrylonitrile-based precursor fibres to carbon fibres*. Journal of Materials Science, 1987. 22(1): p. 278-300 ("Jain 1987").

Li, W., et al., *Structural features of polyacrylonitrile-based carbon fibers*. Journal of Materials Science, 2012. 47(2): p. 919-928 ("Li 2012").

Mukundan, T., et al., *A photocrosslinkable melt processible acrylonitrile terpolymer as carbon fiber precursor*. Polymer, 2006. 47(11): p. 4163-4171 ("Mikundan 2006").

Naskar, A. K., et al., *UV assisted stabilization routes for carbon fiber precursors produced from melt-processible polyacrylonitrile terpolymer*. Carbon, 2005. 43(5): p. 1065-1072 ("Naskar 2005").

Paiva, M. C., et al., *UV stabilization route for melt-processible PAN-based carbon fibers*. Carbon, 2003. 41(7): p. 1399-1409 ("Paiva 2003").

Rahaman, M. S. A., et al., *A review of heat treatment on polyacrylonitrile fiber*. Polymer Degradation and Stability, 2007. 92(8): p. 1421-1432 ("Rahaman 2007").

Rangarajan, P., et al., *Effect of comonomers on melt processability of polyacrylonitrile*. Journal of Applied Polymer Science, 2002. 85(1): p. 69-83 ("Ramgarajan I 2002").

Salem, D. R., *Structure Formation in Polymeric Fibers*. 2001: Hanser ("Salem 2001").

Rangarajan, P., et al., *Dynamic oscillatory shear properties of potentially melt processable high acrylonitrile terpolymers*. Polymer, 2002. 43(9): p. 2699-2709 ("Ramgarajan II 2002").

Yang, D. J., et al., International PCT Patent Application Publication No. WO 2015/175050, Carbon fiber compositions and methods of making, filed Feb. 14, 2015 and published Nov. 19, 2015 ("Yang '050 PCT Patent Application").

The background art of the present disclosure will be described in reference to above mentioned works of literature.

Carbon fibers, because of their excellent mechanical properties with additional good chemical and thermal properties, have attracted interest from the aerospace, sporting goods, automotive, and defense industries [Edie 1998; Bhal 1998; Cantwell 1991; Chand 2000; Li 2012]. Majority of the carbon fibers are manufactured from a polyacrylonitrile (PAN) precursor, although small amounts are derived from other sources like pitches (mesophase), lignin, and hydrated cellulose. Pitch-based precursors have the advantages of low raw materials cost, low energy requirement for carbon fiber preparation and high carbon yield, but their mechanical properties are very poor compared to the PAN-based carbon fibers [Azarova 2011; Baker 2013; Rahaman 2007; Salem 2001]. Thus, due to excellent mechanical properties, PAN-based precursors are found to be the most appropriate [Rahaman 2007; Fu I 2014].

According to a 2012 U.S. government legislation, the average fuel economy of cars and light trucks for the model year 2017 will be 35.5 mpg and for the model year 2025, 54.5 mpg [EPA 2012]. Lowering the vehicle weight will be an effective way to achieve higher fuel economy and to reduce greenhouse gas emission. According to studies by the U.S. Department of Energy (DOE), PAN-based carbon fiber composites have the potential to reduce the weight of the automotive parts as much as 60% compared to metal parts [Baker 2013]. To use the composites for automotive parts, it requires mechanical properties such as tensile strength of 1.72 GPa and a modulus of 172 GPa [Baker 2013]. However, the current technology for the production of PAN-based carbon fibers uses solution spinning process that requires expensive and environmentally hazardous solvents recovery steps. So when the carbon fiber composite parts are used for all car manufacturing, the consumption and recovery of hazardous solvent may create enormous environmental problem as well as economic problem.

Since PAN-based precursors degrade before they melt, solution spinning (20-30 wt % solution) of the precursors using polar solvent is the typical fiber forming process [Ramgarajan I 2002]. Two thermal treatment stages are required for the conversion of the precursors into carbon fibers. In the first stage, the thermal-oxidative 'stabilization' forms a ladder-like structure at temperatures ranging from 200-300° C. in an oxygen-rich environment. The second stage of 'carbonization' is conducted in inert atmosphere usually around 1,000-1,400° C. to form carbon fibers [Cantwell 1991; Rahaman 2007; Jain 1987].

As mentioned above, the solution spinning process is associated with solvent recovery, thereby having high processing costs. The replacement of solution spinning process by melt spinning is a major benefit for a cost-effective and environmentally friendly carbon fiber production. Melt processable carbon fiber precursors were studied by different researchers. For example, co-monomers such as methyl acrylate (MA), itaconic acid (IA), methacrylic acid (MAA), acryl amide (AM), acryloyl benzophenone (ABP) were incorporated with PAN, but their thermal stabilization was always an issue [Fu I 2014; Ramgarajan I 2002; Ramgarajan II 2002; Bhanu 2002; Bortner 2004; Fu II 2014; Godshall 2003; Mikundan 2006; Naskar 2005; Paiva 2003]. In particular, Pavia 2003 et al. [Paiva 2003] and Naskar et al. [Naskar 2005] studied PAN-based melt processable precursor copolymers made with MA and ABP, where a UV-assisted stabilization was required. In 2011, Deng et al reported the potential of poly (acrylonitrile-co-N-vinylimidazole) (AN/VIM) as a new melt processable carbon fiber precursor [Deng 2012; Deng 2011]. This new AN/VIM copolymer does not need the UV treatment for thermal stabilization and may be processed for stabilization as typical PAN-based precursors. Recently, Batchelor et al. reported the melt viscosity reduction for AN/VIM precursor polymer using oligomeric plasticizer where only thermal stabilization was used [Batchelor 2016]. In Yang '050 PCT Patent Application, the present inventors disclosed and taught the preparation of automotive grade carbon fiber from melt processable AN/VIM copolymer. However, in view of the higher cost of VIM in AN/VIM copolymer, there remains a need for low cost alternative melt processable precursors that will make the technology become economically viable.

DISCLOSURE

Technical Problem

In order to solve the above-mentioned problems, an object of the present disclosure is to provide quad-polymer precursors for preparing carbon fibers, a method for preparing the same, and a use method thereof.

Technical Solution

The present disclosure relates to a quad-polymer composition. The quad-polymer composition includes a chemical structure selected from a group consisting of

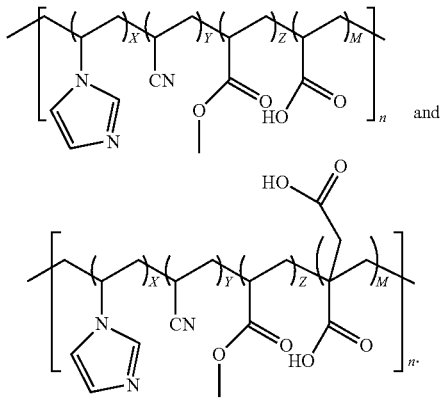

X, Y, Z, and M are wt % of the quad-polymer composition. X+Y+Z+M=100%.

Implementations of the present disclosure may include one or more of the following features:

The quad-polymer composition may have the chemical structure of

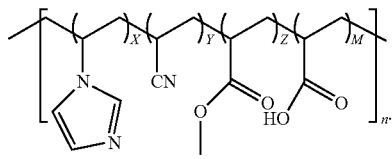

X may be in a range from 0.1 to 40.0 wt %. Y may be in a range from 50.0 to 99.0 wt %. Z may be in a range from 0.1 to 50.0 wt %. M may be in a range from 0.1 to 40.0 wt %.

X may be in a range from 0.1 to 10.0 wt %. Y may be in a range from 60.0 to 95.0 wt %. Z may be in a range from 2.5 to 30.0 wt %. M may be in a range from 0.1 to 10.0 wt %.

X may be in a range from 0.1 to 5.0 wt %. Y may be in a range from 70.0 to 92.5 wt %. Z may be in a range from 2.5 to 25.0 wt %. M may be in a range from 0.1 to 5.0 wt %.

The quad-polymer composition may have the chemical structure of

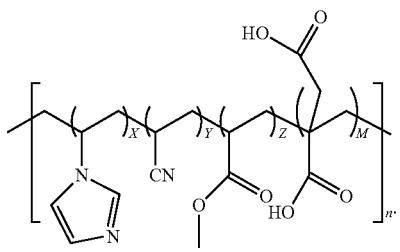

X may be in a range from 0.1 to 40.0 wt %. Y may be in a range from 50.0 to 99.0 wt %. Z may be in a range from 0.1 to 50.0 wt %. M may be in a range from 0.1 to 40.0 wt %.

X may be in a range from 0.1 to 10.0 wt %. Y may be in a range from 60.0 to 95.0 wt %. Z may be in a range from 2.5 to 30.0 wt %. M may be in a range from 0.1 to 10.0 wt %.

X may be in a range from 0.1 to 5.0 wt %. Y may be in a range from 70.0 to 92.5 wt %. Z may be in a range from 2.5 to 25.0 wt %. M may be in a range from 0.1 to 5.0 wt %.

The quad-polymer composition may have a molecular weight ranging from 18 KDa to 200 KDa. The quad-polymer composition may have a polydispersity index (PDI) ranging from 1.2 to 3.0.

In general, in another aspect, the present invention features a method of preparing a quad-polymer composition. The method includes synthesizing the quad-polymer composition from (a) acrylonitrile, (b) vinylimidazole, (c) methyl acrylate, and (d) an acid selected from a group consisting of acrylic acid and itaconic acid. The quad-polymer has a chemical structure in which:

(A) when the acid is the acrylic acid, the chemical structure is:

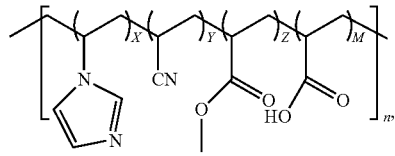

and (B) when the acid is the itaconic acid, the chemical structure is:

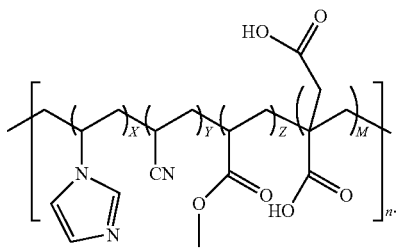

X, Y, Z, and M are wt % of the quad-polymer composition. X+Y+Z+M=100%.

Implementations of the present invention may include one or more of the following features:

The acid may be the acrylic acid, and the chemical structure is:

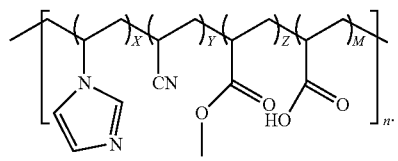

The acid may be the itaconic acid, and the chemical structure is:

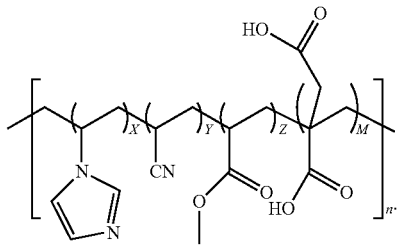

The wt % of the acrylonitrile, wt % of the vinylimidazole, wt % of the methyl acrylate, and wt % of the acid may be total wt % with respect to a total wt % of 100%. The wt % of the acrylonitrile may be in a range from 50.0 to 99.0 wt %. The wt % of the vinylimidazole may be in a range from 0.1 to 40.0 wt %. The wt % of the methyl acrylate may be in a range from 0.1 to 50.0 wt %. The wt % of the acid may be in a range from 0.1 to 40.0 wt %.

X may be in a range from 0.1 to 40.0 wt %. Y may be in a range from 50.0 to 99.0 wt %. Z may be in a range from 0.1 to 50.0 wt %. M may be in a range from 0.1 to 40.0 wt %.

The wt % of the acrylonitrile may be in a range from 60.0 to 95.0 wt %. The wt % of the vinylimidazole may be in a range from 0.1 to 10.0 wt %. The wt % of the methyl acrylate may be in a range from 2.5 to 30.0 wt %. The wt % of the acid may be in the range from 0.1 to 10.0 wt %.

X may be in a range from 0.1 to 10.0 wt %. Y may be in a range from 60.0 to 95.0 wt %. Z may be in a range from 2.5 to 30.0 wt %. M may be in a range from 0.1 to 10.0 wt %.

The wt % of the acrylonitrile may be in a range from 70.0 to 92.5 wt %. The wt % of the vinylimidazole may be in a range from 0.1 to 5.0 wt %. The wt % of the methyl acrylate may be in a range from 2.5 to 25.0 wt %. The wt % of the acid may be in the range from 0.1 to 10.0 wt %.

X may be in a range from 0.1 to 5.0 wt %. Y may be in a range from 70.0 to 92.5 wt %. Z may be in a range from 2.5 to 25.0 wt %. M may be in a range from 0.1 to 10.0 wt %.

In general, in another aspect, the present invention features a quad-polymer composition. The quad-polymer composition includes a first monomer, a second monomer, a third monomer, and a fourth monomer. The first monomer is acrylonitrile at a wt % of Y in the quad-polymer composition. The second monomer is selected from a group consisting of 1-vinylimidazole, 4-vinylimidazole, 2-vinylimidazole and 1-methyl-2-vinylimidazole, in which the second monomer is at a wt % of X in the quad-polymer composition. The third monomer is an acrylate at a wt % of Z in the quad-polymer composition. The acrylate is selected from a group consisting of methyl acrylate, ethyl acrylate, butyl acrylate, methyl methacrylate, and tert-butyl acrylate. The fourth monomer is an acid at a wt % of M in the quad-polymer composition. The acid is selected from a group consisting of acrylic acid, itaconic acid, and methacrylic acid. The total of the Y wt % of the first monomer, the X wt % of the second monomer, the Z wt % of the third monomer, and the M wt % of the fourth monomer equals 100%.

Implementations of the present invention may include one or more of the following features:

The second monomer may be 1-vinylimidazole. The third monomer may be methyl acrylate. The fourth monomer may be acrylic acid or itaconic acid.

In general, in another aspect, the present invention features a method for forming fibers of quad-polymers. The quad-polymer includes a first monomer that is acrylonitrile. The quad-polymer further includes a second monomer that is selected from a group consisting of 1-vinylimidazole, 4-vinylimidazole, 2-vinylimidazole, and 1-methyl-2-vinylimidazole. The quad-polymer further includes a third monomer that is selected from a group consisting of methyl acrylate, ethyl acrylate, butyl acrylate, methyl methacrylate, and tert-butyl acrylate. The quad-polymer further includes a fourth monomer that is an acid and is selected from a group consisting of acrylic acid, itaconic acid, and methacrylic acid. The method includes the steps of combining the first monomer, the second monomer, the third monomer, and the fourth monomer to form the quad-polymer composition. The method further includes the steps of melt-spinning the quad-polymer composition to form fibers of the quad-polymer composition.

Implementations of the present invention may include one or more of the following features:

The step of combining the first monomer, the second monomer, the third monomer, and the fourth monomer to form the quad-polymer composition may include utilizing a solvent. The solvent may be selected from the group consisting of dimethylformamide (DMF), dimethyl sulfoxide (DMSO), dimethylacetamide (DMAc), N-methyl-2-pyrrolidone (NMP), and mixtures thereof.

The melt-spinning of the quad-polymer may obtain thin fibers. The thin fibers may have diameters of between around 10 mm and 250 mm.

The thin fibers may be obtained by including a process selected from a group consisting of (a) using dies in capillary rheometer; (b) stretching the molten polymer under tension; and (c) combinations thereof.

The step of combining the first monomer, the second monomer, the third monomer, and the fourth monomer to form the quad-polymer composition may include using an initiator to initiate radical polymerization.

The initiator may include a thermal initiator.

The thermal initiator may be selected from a group consisting of 2,2'-azobisisobutyronitrile (AIBN), 1,1'-azobis(cyclohexanecarbonitrile), benzoyl peroxide, tert-butyl peroxide and lauroyl peroxide, and combinations thereof.

The thermal initiator may be the 2,2'-azobisisobutyronitrile (AIBN).

The step of combining the first monomer, the second monomer, the third monomer, and the fourth monomer to form the quad-polymer composition may include utilizing a chain transfer agent.

The chain transfer agent may include 1-dodecanethiol.

The step of melt spinning may be carried out, at least in part, at a temperature in the range of 100° C. and 200° C.

The step of melt spinning may be carried out, at least in part, in an atmospheric atmosphere or an inert atmosphere.

The method may further include an additional step selected from the group consisting of (i) annealing the fibers; (ii) stabilizing the fibers; (iii) carbonizing the fibers; and (iv) a combination thereof.

The additional step may include (i) annealing the fibers; (ii) stabilizing the fibers; and (iii) carbonizing the fibers.

The second monomer may be vinylimidazole. The third monomer may be methyl acrylate. The third monomer may be acrylic acid or itaconic acid.

The additional step may include the step of annealing. The step of annealing may be carried out, at least in part, at a temperature in the range of 100° C. and 190° C. while applying tension to the fiber.

The additional step may include the step of annealing. Diameters of the quad-polymer fibers may be reduced to be in the range of 1 µm and 300 µm by repeated drawing of the fibers during the step of melt spinning and the step of annealing.

The diameters of the quad-polymer fibers may be in the range of 1 µm and 40 µm.

The diameters of the quad-polymer fibers may be in the range of 1 µm and 20 µm.

The additional step may include the step of annealing and the step of stabilizing.

The step of annealing and the step of stabilizing may be performed together.

The step of annealing and the step of stabilizing may be performed separately. The step of annealing and the step of stabilizing may be performed at different temperatures.

The step of stabilizing may be carried out by a process that includes heating the quad-polymer fibers to a first temperature. The step of stabilizing may be carried out by a process that further includes maintaining the quad-polymer fibers at the first temperature for a first period of time. The step of stabilizing may be carried out by a process that further includes heating the quad-polymer fibers to a second temperature. The step of stabilizing may be carried out by a process that further includes maintaining the quad-polymer fibers at the second temperature for a second period of time.

The step of annealing may include heating the quad-polymer fibers to a third temperature. The step of annealing may further include maintaining the quad-polymer fibers at the third temperature for a first period of time. The step of annealing may further include cooling the quad-polymer fibers to room temperature, in which the step of annealing occurs before the step of stabilizing.

The step of stabilizing may further include heating the quad-polymer fibers to 190° C. at a rate of 3° C. per minute. The step of stabilizing may further include maintaining the quad-polymer fibers at 190° C. during a first period of 180 minutes. The step of stabilizing may further include heating the quad-polymer fibers to 240° C. at a rate of 1° C. per minute. The step of stabilizing may further include maintaining the quad-polymer fibers at 190° C. during a second period of 180 minutes. The step of stabilizing may further include cooling the quad-polymer fibers to room temperature.

The step of annealing may include heating the quad-polymer fibers to 130° C. The step of annealing may further include maintaining the quad-polymer fibers at 190° C. during a third period of 48 hours. The step of annealing may further include cooling the quad-polymer fibers to room temperature. The step of annealing may occur before the step of stabilizing.

The step of carbonizing may be performed by heating the stabilized fibers to a temperature between 900° C. and 1400° C. under an inert atmosphere.

The quad-polymer composition may have a molecular weight ranging from 18 KDa to 200 KDa. The quad-polymer composition may have a polydispersity index (PDI) ranging from 1.2 to 3.0.

In general, in another aspect, the present invention features a carbon fiber composition made from a quad-polymer that includes between 70 and 92.5 wt % of an acrylonitrile monomer. The quad-polymer further includes between 0.1 and 5.0 wt % of a vinylimidazole monomer. The quad-polymer further includes between 2.5 and 25.0 wt % of a methyl acrylate monomer. The quad-polymer further includes between 0.1 and 5.0 wt % of an acid monomer. The acid monomer is an acrylic acid monomer or an itaconic acid monomer. The carbon fiber composition is prepared by melt spinning, stabilizing and carbonizing. The carbon fiber composition has a diameter ranging between 0.5 µm and 150 µm.

Implementations of the present invention may include one or more of the following features:

The carbon fiber composition may have a diameter ranging from 0.5 µm to 30 µm.

The carbon fiber composition may have a diameter ranging from 0.5 µm to 15 µm.

In general, in another aspect, the present invention features a device that includes the quad-polymer composition described above.

Implementations of the present invention may include one or more of the following features:

The device is selected from a group consisting of supercapacitors, lithium battery electrodes, wound healing fibers, fabrics, coatings, and films, and anti-bacterial/microbial fibers, fabrics, coatings, and films.

In general, in another aspect, the present invention features a device that includes a fiber that includes the quad-polymer composition described above.

Implementations of the present invention may include one or more of the following features:

The fiber is made by the process described above.

The device is selected from a group consisting of automobile, aerospace structures, marine structures, military equipment/parts, sporting goods, robotics, furniture, and electronic parts.

The foregoing has outlined rather broadly the features and technical advantages of the present invention in order that the detailed description of the present invention that follows may be better understood. Additional features and advantages of the present invention will be described hereinafter that form the subject of the claims of the present invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the present invention as set forth in the appended claims.

It is also to be understood that the present invention is not limited in its application to the details of construction and arrangements of the components set forth in the following description or illustrated in the drawings. The present invention is capable of other embodiments and of being practiced and carried out in various ways. Also, it is to be understood that the phraseology and terminology employed herein are for the purpose of the description and should not be regarded as limiting.

Advantageous Effects

The present invention describes the synthesis of new melt processable carbon fiber precursors. Free radical solution polymerization technique is used to the precursor polymers which are chemically and thermally characterized. Use of low cost raw materials makes them cost effective compared to the current technology. Suitable thermal properties enable the polymers to be melt processable. Thin fibers are prepared by melt-extrusion of the precursor polymers. These melt-extruded precursor fibers have the ability to undergo thermal stabilization in atmospheric condition. Thermally stabilized fibers are used to make high strength carbon fibers by carbonization process at inert conditions. Both single precursor fibers and tow of the precursor fibers are thermally stabilized and carbonized to yield carbon fibers.

The present invention provides a method for preparing lower cost carbon fibers via the use of a four-component system of less expensive monomers. Each monomer has a specific purpose and use for the development of melt processable carbon fibers. The acrylonitrile is the main component that is required for the development of carbon fibers. It is the nitrile groups that cyclize to form the network of carbon fiber. When vinylimidazole (VIM) is incorporated into PAN, it allows for melt processing by disrupting the crystallinity, while the unsaturated pendant imidazole groups assist the thermal crosslink ability at elevated temperatures. The microstructure and the mechanical properties of the carbon fibers are further affected by the VIM that helps balancing the atomic ratio of nitrogen to carbon (N/C) [Guigon 1986; Deng 2009; Eng 1986], while the third component methyl acrylate is also incorporated to enhance the melt property of the system. The use of methyl acrylate (a low cost monomer) alleviates the higher cost of N-vinylimidazole. Then the fourth components, acrylic acid or itaconic acid are used for the advancement of the initiation of stabilization in a thermal environment. Purposes of the development of a quad-polymer system are (1) for the lowering of the raw material cost associated with the higher price of the AN/VIM copolymer and (2) for enhancing polymer's thermal stability during melt-spinning process and polymer fiber's thermal stabilization.

BEST MODE

The present invention provides a method for preparing a carbon fiber via the use of a four-component system of monomers. Each monomer has a specific purpose and use for the development of melt processable carbon fiber. The acrylonitrile (AN) is the main component that is required for the development of carbon fiber. It is a nitrile group that is cyclized to form the network of carbon fibers. The N-vinylimidazole (VIM) is the component that allows for the melt processability while keeping the carbon-to-nitrogen (C/N) ratios at the proper level for development of high strength fibers. While the third component methyl acrylate (MA) is also a melt processable monomer unit, the main purpose is for the lowering of costs which offsets the higher costs of N-vinylimidazole. Then the fourth components, acrylic acid (AA) or itaconic acid (IA), are used for the advancement of the initiation of stabilization in a thermal environment. The main purpose of the development of a quad-polymer system is for (1) the lowering of the developmental costs associated with the high price of the original copolymer, while also (2) enhancing the stabilization of the polymer fibers.

AN-VIM-MA-AA Quad-Polymer Synthesis

Figure 1:
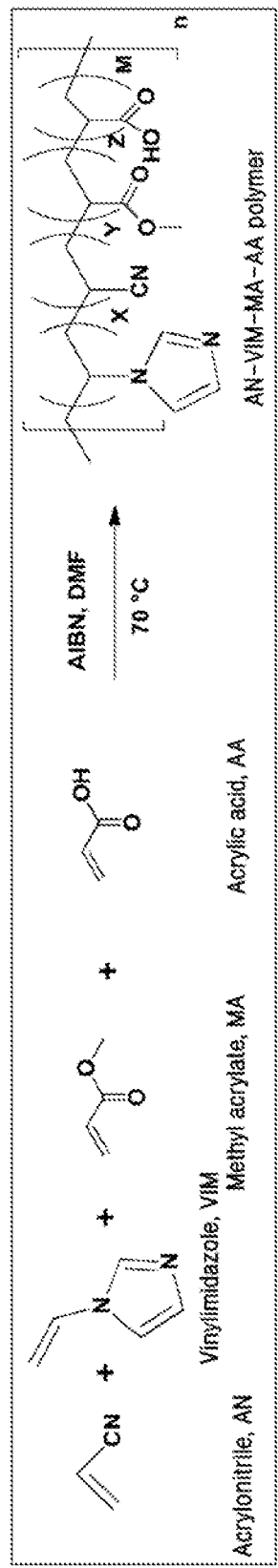
FIG. 1 shows a synthesis scheme of an AN-VIM-MA-AA quad-polymer precursor by free radical polymerization.

Yang '050 PCT Patent Application discloses and teaches various synthesis of AN-based copolymers, including the synthesis of acrylonitrile (AN) and N-vinylimidazole (VIM) to form a copolymer (See, e.g., FIG. 1 of Yang '050 PCT Patent Application). Although the polymerization of the present invention may be performed in a similar fashion, the monomers that are used are altered, as in the scheme shown in FIG. 1, which illustrates a scheme of the solution polymerization of AN, VIM, MA, and AA. Yang '050 PCT Patent Application is attached hereto at Appendix 1 and is hereby incorporated by reference in its entirety of all purposes.

In an embodiment of the present invention, the free radical solution polymerization of AN, VIM, MA, and AA monomers was carried out in 250-2,000 mL flasks fitted with a thermocouple probe, a condenser, an addition funnel and a nitrogen inlet. The flask was charged with DMF and purged with nitrogen for 30 minutes. Then the monomers, AIBN, and chain transfer agent, 1-dodecanethiol were added drop wise into the flask over a period of 2-8 hours. The polymerization reactions were carried out at 70° C. with continuous stirring over-night. The polymer was precipitated in deionized water, filtered and washed with methanol and hexane to remove residual monomers and then dried in a vacuum oven for two days till constant weight was obtained.

The co-monomers in the AN-VIM-MA-AA quad-polymer may be present in any suitable ratio in the quad-polymer. For example, if four monomers AN, VIM, MA, and AA are used, the resulting quad-polymer may have a range of weight ratios of AN:VIM:MA:AA, such that the total of the monomers adds up to 100% in wt %.

Figure 2:
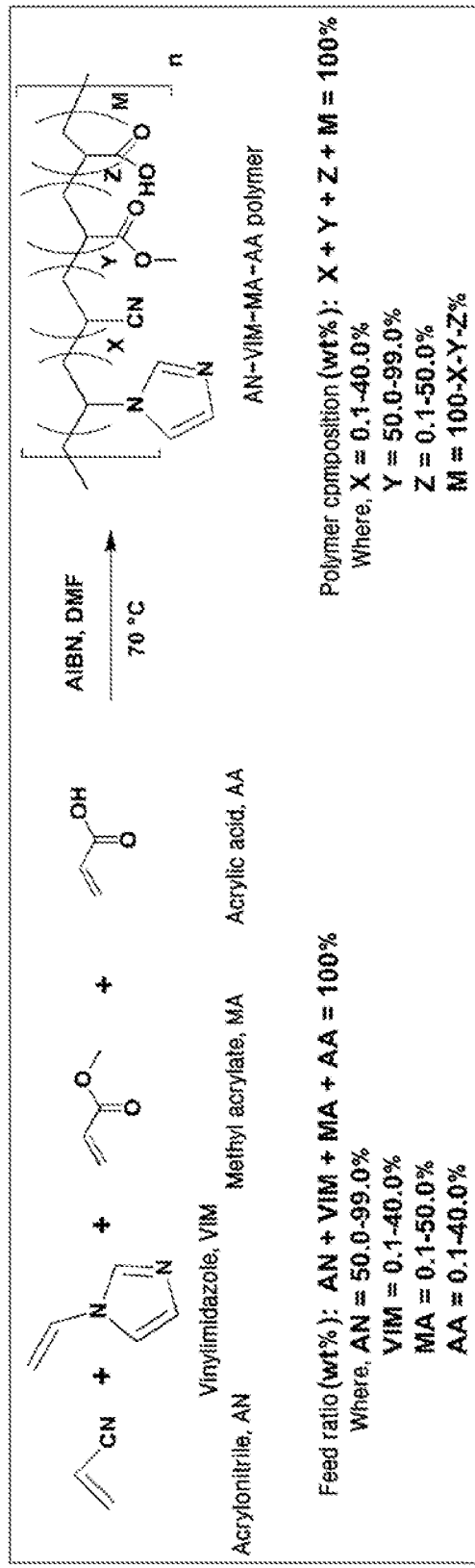
FIG. 2 shows an AN-VIM-MA-AA quad-polymer synthesis scheme, including a first range of ratios of monomers (by wt %) in the feed and resulting polymers.

In certain embodiments of the present invention, the amount of each monomer in the feed and product of a quad-polymer varies as shown in FIG. 2. Specifically, these are as follows.

Feed ratios (wt %): AN+VIM+MA+AA=100%, where

AN=50.0-99.0 wt %

VIM=0.1-40.0 wt %

MA=0.1-50.0 wt %

AA=0.1-40.0 wt % and the product (AN-VIM-MA-AA polymer) has the following chemical formula

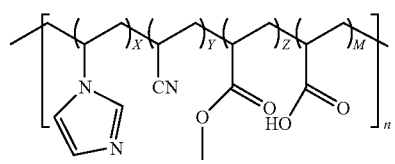

with polymer composition (wt %): X+Y+Z+M=100%, where

X=0.1-40.0 wt %

Y=50.0-99.0 wt %

Z=0.1-50.0 wt %

M=100-X-Y-Z %.

Figure 3:
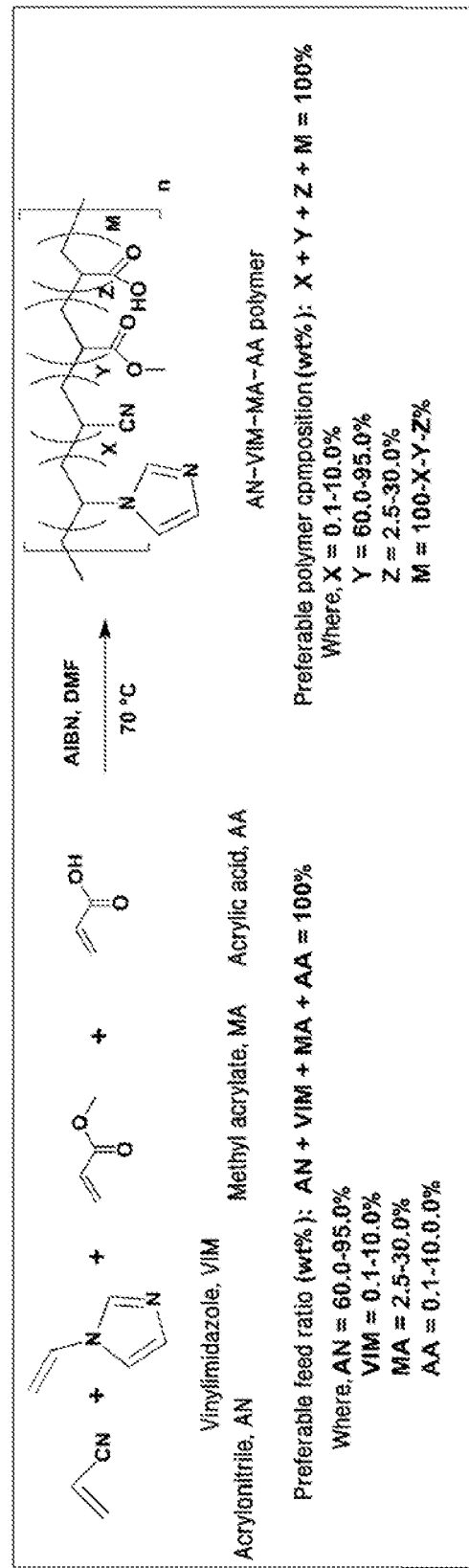
FIG. 3 shows the AN-VIM-MA-AA quad-polymer synthesis scheme, including a second range of ratios of monomers (by wt %) in the feed and resulting polymers.

In certain embodiments, more preferably, the amount of each monomer in the feed and product of a quad-polymer varies as shown in FIG. 3. Specifically, these are as follows:

Feed ratios (wt %): AN+VIM+MA+AA=100%, where

AN=60.0-95.0 wt %

VIM=0.1-10.0 wt %

MA=2.5-30.0 wt %

AA=0.1-10.0 wt % and the product (AN-VIM-MA-AA polymer) has the following chemical formula

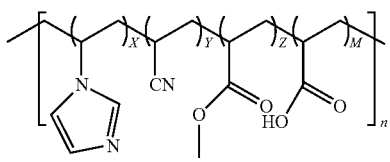

with polymer composition (wt %): X+Y+Z+M=100%, where
X=0.1-10.0 wt %
Y=60.0-95.0 wt %
Z=2.5-30.0 wt %
M=100-X-Y-Z %.

Figure 4:
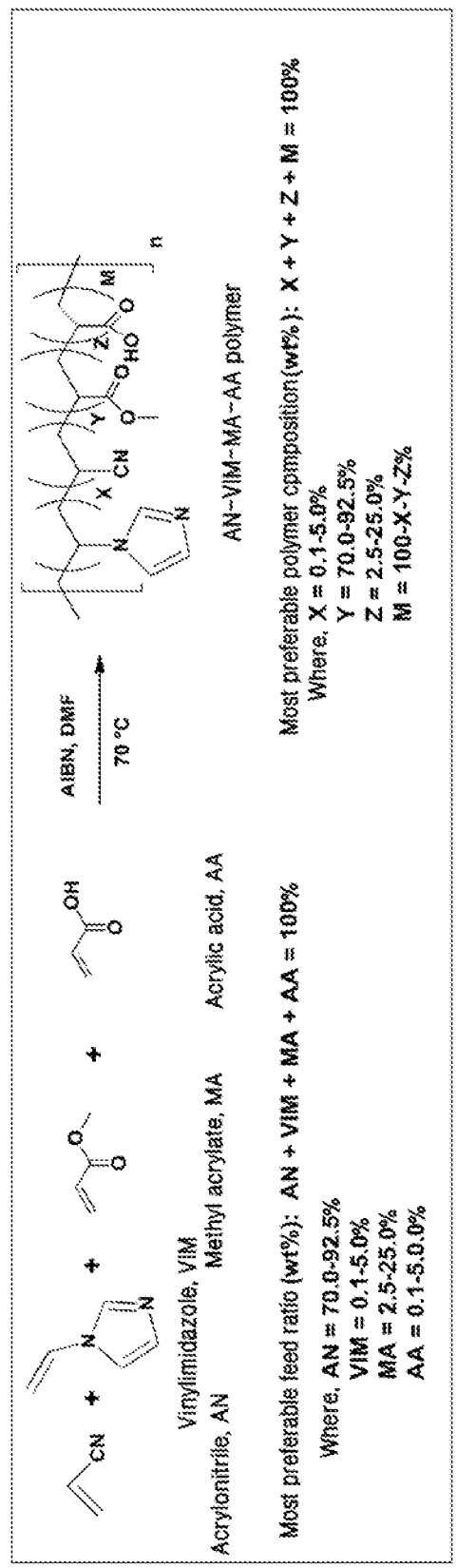
FIG. 4 shows the AN-VIM-MA-AA quad-polymer synthesis scheme, including a third range of ratios of monomers (by wt %) in the feed and resulting polymers.

In certain embodiments, most preferably, the amount of each monomer in the feed and product of a quad-polymer varies as shown in FIG. 4. Specifically, these are as follows.

Feed ratios (wt %): AN+VIM+MA+AA=100%, where
AN=70.0-92.5 wt %
VIM=0.1-5.0 wt %
MA=2.5-25.0 wt %
AA=0.1-5.0 wt %
and the product (AN-VIM-MA-AA polymer) has the following chemical formula

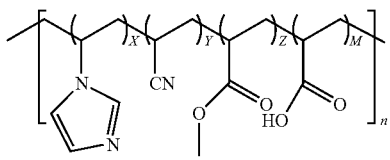

with polymer composition (wt %): X+Y+Z+M=100%, where
X=0.1-5.0 wt %
Y=70.0-92.5 wt %
Z=2.5-25.0 wt %
M=100-X-Y-Z %.

For example, in an embodiment of the present invention ("Example A"), the free radical polymerization of 28.80 gm of a mixture of AN, VIM, MA and AA monomers (AN: 79.0 parts, VIM: 2.5 parts, MA: 16.0 parts and AA: 2.5 parts by weight) was carried out in a 500 mL flask fitted with a thermocouple probe, a condenser, an addition funnel, and a nitrogen inlet. The flask was charged with 33 gm of DMF and purged with nitrogen for 30 minutes. Then the monomers, DMF (33.6 gm), AIBN (0.123 gm), and chain transfer agent, 1-dodecanethiol (0.016 gm) were added drop wise into the flask over a period of 2 hours. The polymerization reactions were carried out at 70° C. with continuous stirring over-night. The polymers were precipitated in de-ionized water, filtered and washed with methanol and hexane to remove residual monomers and then dried in a vacuum oven for two days till constant weight was obtained. Polymer yield was in between 95 and 85%. This resulting product is referred to as "Example A" herein and in FIGS. 5 to 8.

Further, for example, in another embodiment of the present invention ("Example B"), the free radical polymerization of 281.0 gm of a mixture of AN, VIM, MA and AA monomers (AN: 85.0 parts, VIM: 2.5 parts, MA: 10.0 parts and AA: 2.5 parts by weight) was carried out in a 2000 mL flask fitted with a thermocouple probe, a condenser, an addition funnel and a nitrogen inlet. The flask was charged with 330.0 gm of DMF and purged with nitrogen for 30 minutes. Then the monomers, DMF (336 gm), AIBN (1.232 gm) and chain transfer agent, 1-dodecanethiol (0.16 gm) were added drop wise into the flask over a period of 8 hours. The polymerization reactions were carried out at 70° C. with continuous stirring over-night. The polymers were precipitated in de-ionized water, filtered and washed with methanol and hexane to remove residual monomers and then dried in a vacuum oven for two days till constant weight was obtained. Polymer yield was in between 93 and 88%. This resulting product is referred to as "Example B" herein and in FIGS. 5 to 8.

Figure 5:
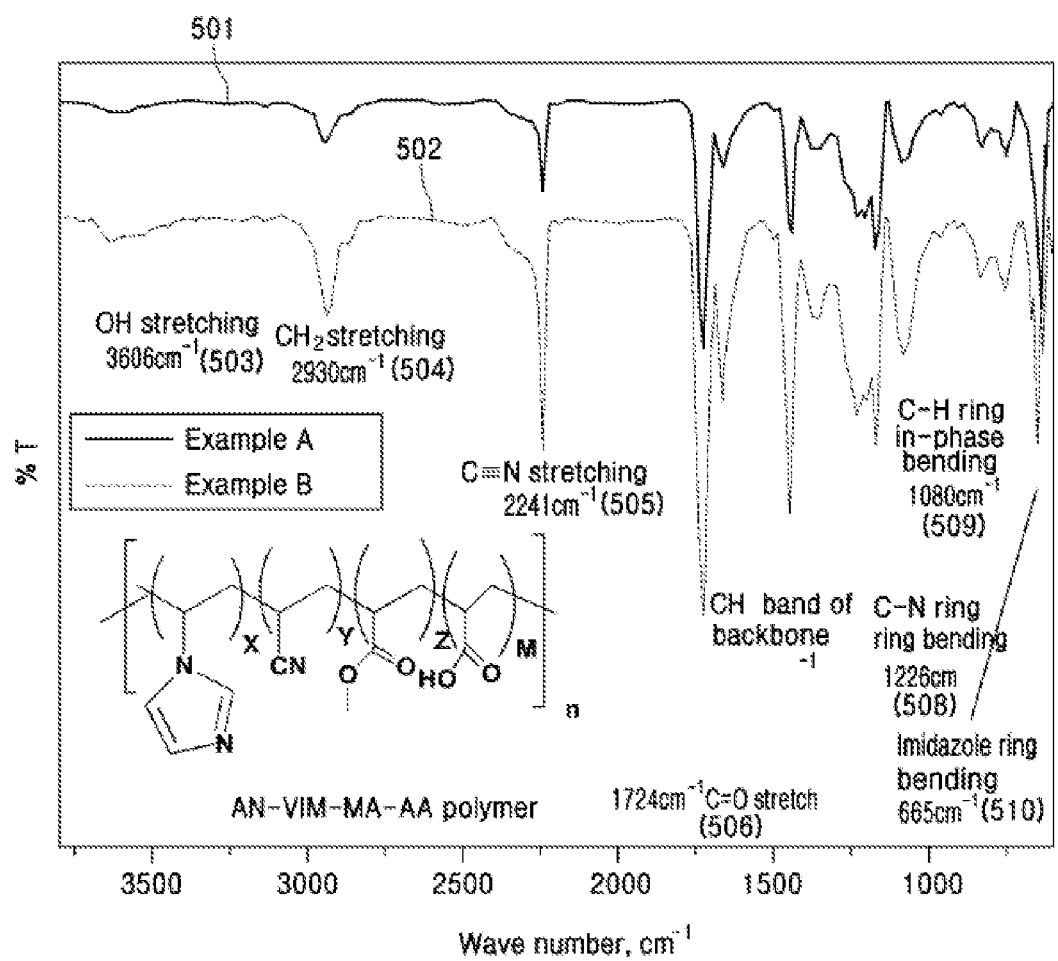
FIG. 5 is a graph showing the ATR-FTIR spectra of two AN-VIM-MA-AA quad-polymers synthesized using embodiments of the present invention.
Figure 6:
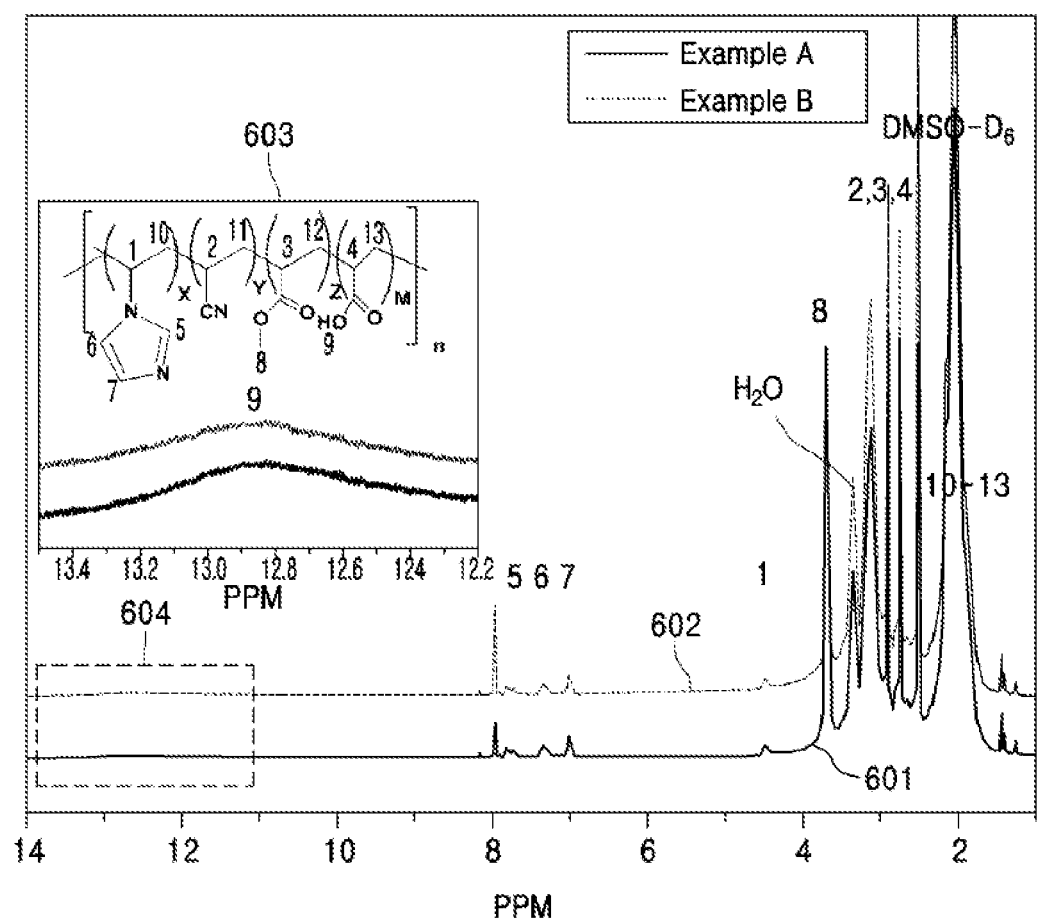
FIG. 6 is a graph showing the $^1$H-NMR spectra of the two AN-VIM-MA-AA quad-polymers whose ATR-FTIR spectrum is shown in FIG. 5.

The success of polymerization was evaluated by ATR-FTIR spectroscopy and $^1$H-NMR spectroscopy as shown in FIG. 5 and FIG. 6, respectively.

FIG. 5 shows the ATR-FTIR spectrum 501 of Example A and the ATR-FTIR spectrum 502 of Example B. These spectra 501 and 502 show the polymerizations of Examples A and B were successful. The major peaks were identified and marked in FIG. 5, which are OH stretching 503 (3606 cm$^{-1}$), CH$_2$ stretching 504 (2930 cm$^{-1}$), C≡N stretching 505 (2241 cm$^{-1}$), C=O stretch 506 (1724 cm$^{-1}$), CH$_2$ band of backbone 507 (1442 cm$^{-1}$), C—N ring stretching 508 (1226 cm$^{-1}$), C—H ring in-phase bending 509 (1080 cm$^{-1}$), and imidazole ring bending 510 (665 cm$^{-1}$).

FIG. 6 shows the $^1$H-NMR spectrum 601 of Example A and the $^1$H-NMR spectrum 602 of Example B. These spectra 601 and 602 show the polymerizations of Examples A and B were successful. Insert 603 is a magnified view of the spectra in dashed box 604. In the chemical formula, the major peaks were identified and marked in FIG. 6 (corresponding the following polymer), which is also shown in the insert 603.

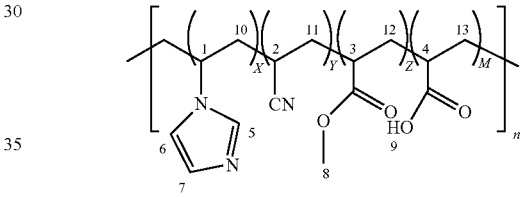

The monomer ratios in the feed and the polymer were in accordance with the ratios set forth in FIG. 4 (for the most preferred compositions).

Generally, higher molecular weight polymers will produce higher strength fibers. However, extremely high molecular weight polymers adversely may affect the ability of melt-processing because a high molecular weight polymer yields higher melt viscosity. When the viscosity is too high, the resulting compositions may be difficult to extrude.

In embodiments of the present invention, the molecular weight of the quad-polymers ranged from 18 KDa-300 KDa with a polydispersity index (PDI) of 1.2-4.0. In certain embodiments of the present invention, the molecular weight of the quad-polymers ranged from 40 KDa-120 KDa with a PDI of 1.2-2.0.

Figure 7:
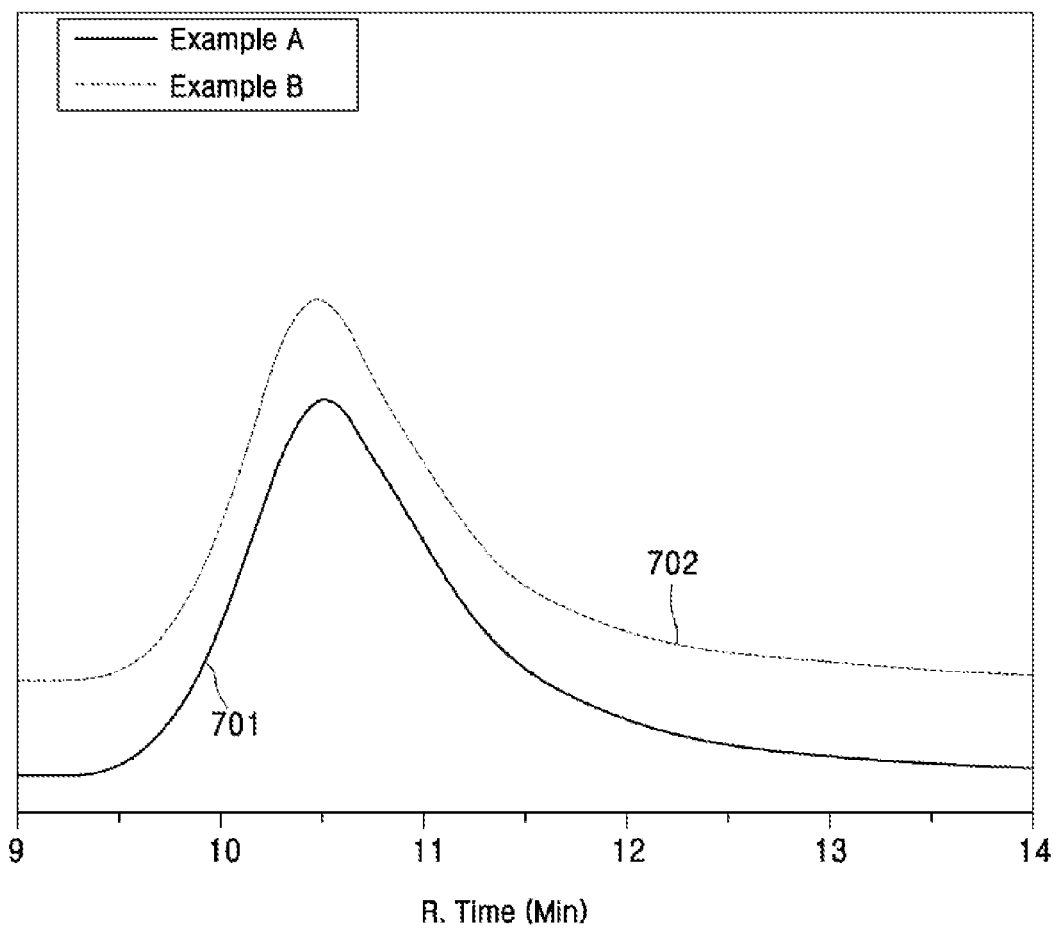
FIG. 7 is a graph showing the GPC chromatogram of the two AN-VIM-MA-AA quad-polymers whose ATR-FTIR spectrum is shown in FIG. 5.

FIG. 7 shows the GPC chromatogram 701 of Example A and the GPC chromatogram 702 of Example B. The result of this GPC analysis is shown below in Table 1.

TABLE 1

GPC analysis of polymer samples from Example A and Example B

| Example | Mn, KDa | Mw, KDa | PDI |
|---|---|---|---|
| A | 71.4 | 95.5 | 1.3 |
| B | 67.0 | 95.1 | 1.4 |

Figure 8:
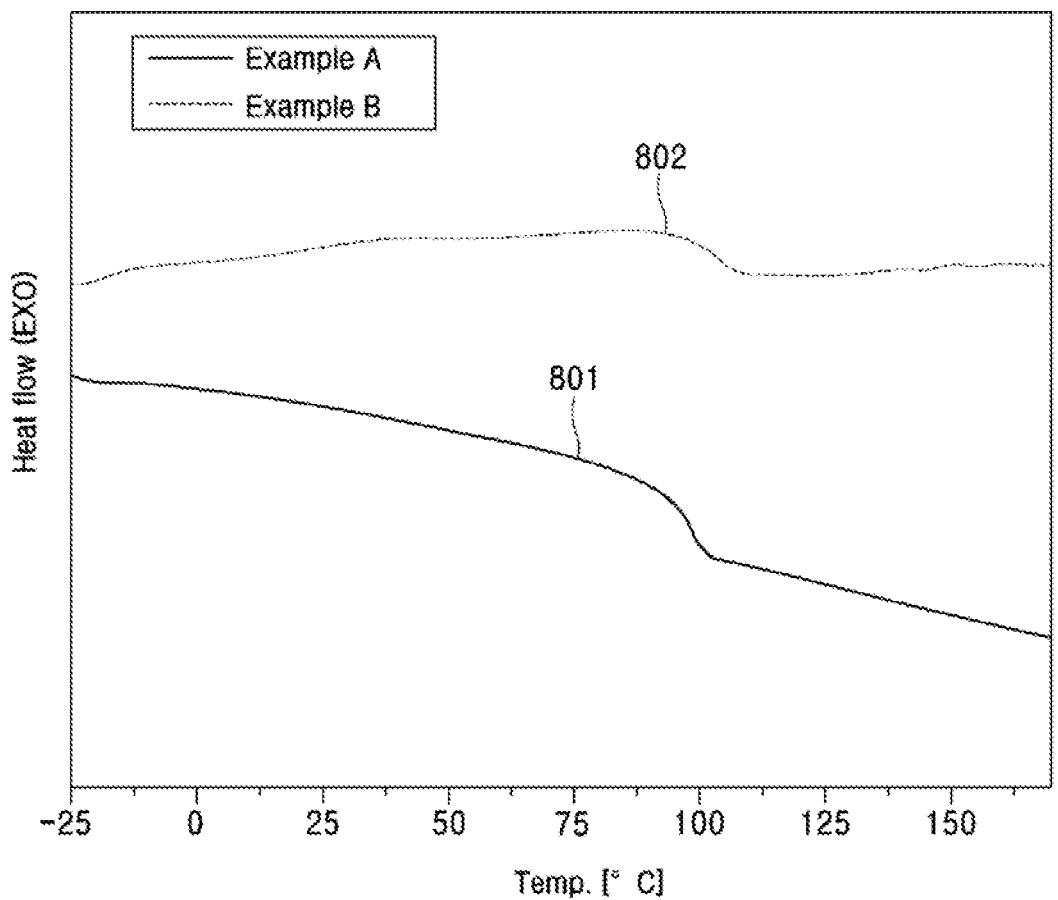
FIG. 8 is a graph showing the DSC thermogram of the two AN-VIM-MA-AA quad-polymers whose ATR-FTIR spectrum is shown in FIG. 5.

FIG. 8 shows the DSC thermogram 801 of Example A and the DSC thermogram 802 of Example B, with the DSC analysis of Example A and Example B having a glass transition temperature at ~98° C. and ~103° C., respectively, as shown in this figure.

The polymer samples from both Example A and Example B showed excellent thermal stability, as evident from their high degradation temperature (~250° C.) evident from thermo-gravimetric analysis (TGA). High char yield (~52%) for both Examples A and Example B were also observed from char yield analysis. The summary of the DSC, TGA, and char yield analysis are shown below in Table 2.

TABLE 2

Summary of thermal analysis

| Example | Te, ° C. | Td, ° C. | Char, % |
|---------|----------|----------|---------|
| A | 98 | 250 | 50 |
| B | 103 | 260 | 52 |

Further, for example, in another embodiment of the present invention (Example C"), a quad-polymer precursor was prepared that demonstrated excellent extrude ability, thermal stabilization, and carbonization capability. Example C is an AN-VIM-MA-AA quad-polymer with a feed composition of AN:VIM:MA:AA=79:2.5:16:2.5 wt %. This new precursor polymer has low $T_g$ of 97° C. and may be extruded into thin fiber. One major advantage is its capability of thermal stabilization. Similar to the AN-VIM copolymer precursor (disclosed and taught in Yang '050 PCT Patent Application), this new quad-polymer precursor is thermally stabilizable so it does not require any UV treatment. The raw material cost for this quad-polymer precursor will be ~1.45 $/lb which is ~22% lower than the threshold value of 1.85 $/lb for the AN-VIM copolymer precursor. Mechanical testing results also showed excellent properties for these precursors. The carbonized fiber with 77 µm diameter showed a tensile strength (TS) of 894 MPa and Young's modulus (YM) of 220 GPa while the stabilized fiber showed a TS of 294 MPa and a modulus of 7004 MPa. The TSs of neat and annealed fibers were 109 MPa and 163 MPa, respectively. Also upon optimized extrusion condition, very thin fiber may be made. Such a fiber with 25 µm diameter showed high mechanical strength as TS of 369 MPa and YM of 7.4 GPa.

Melt Spun Fibers

Figure 9:
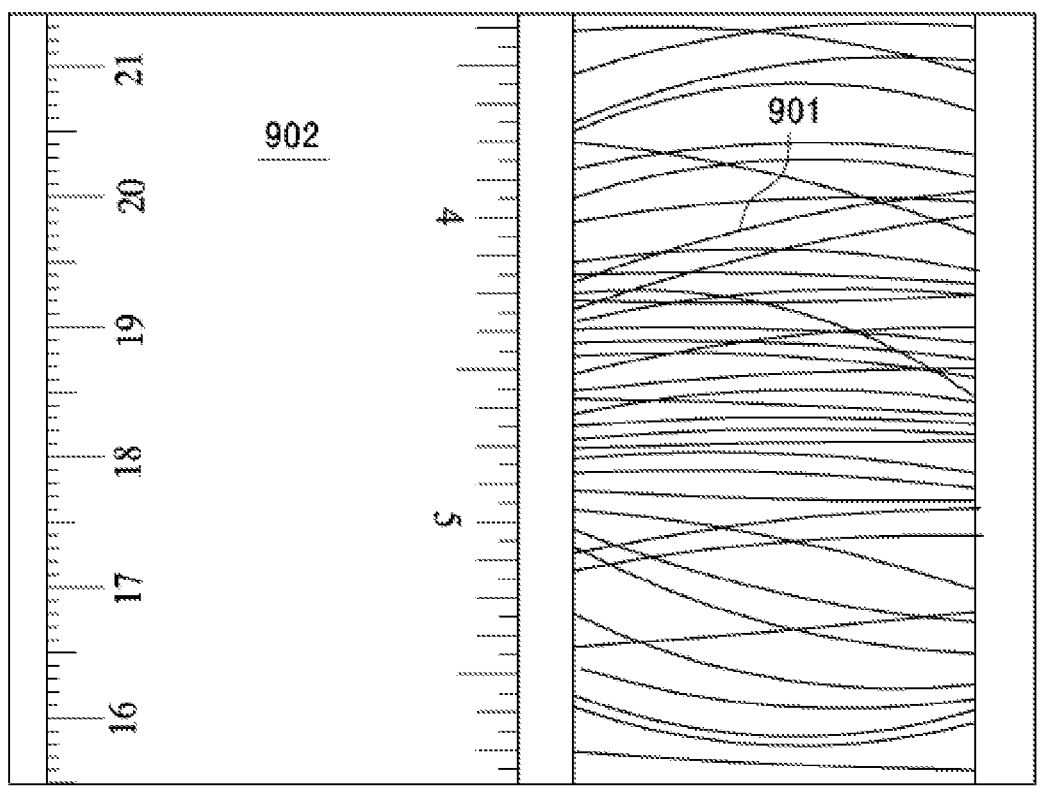
FIG. 9 is an image of a melt-extruded continuous fiber from an AN-VIM-MA-AA quad-polymer.
Figure 10:
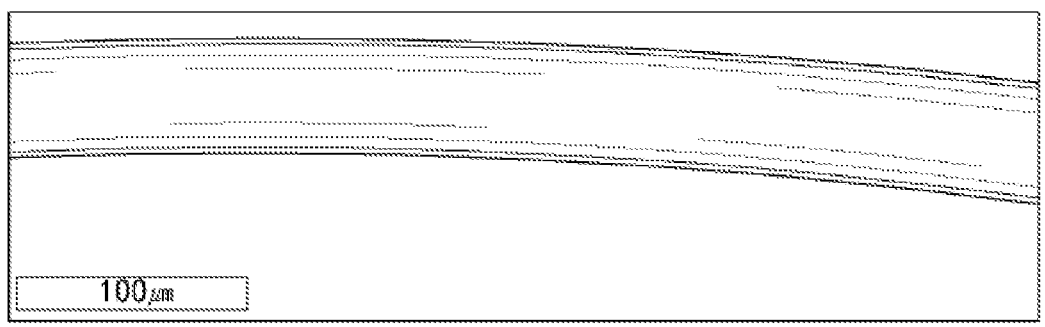
FIG. 10 is an image of an as-spun fiber from an AN-VIM-MA-AA quad-polymer having a diameter of ~68 mm.
Figure 11:
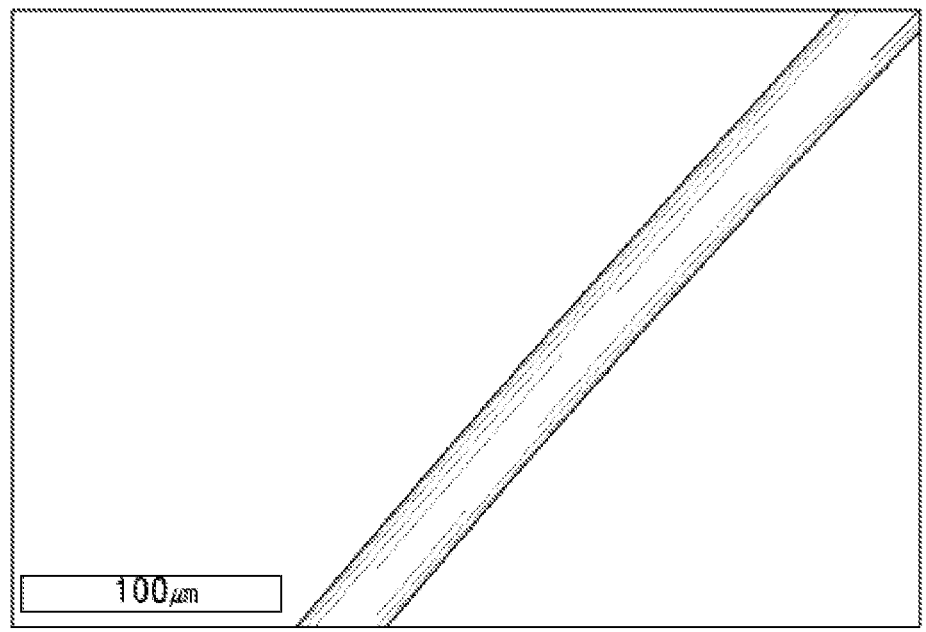
FIG. 11 is an image of an as-spun fiber from an AN-VIM-MA-AA quad-polymer having a diameter of ~25 mm.
Figure 12:
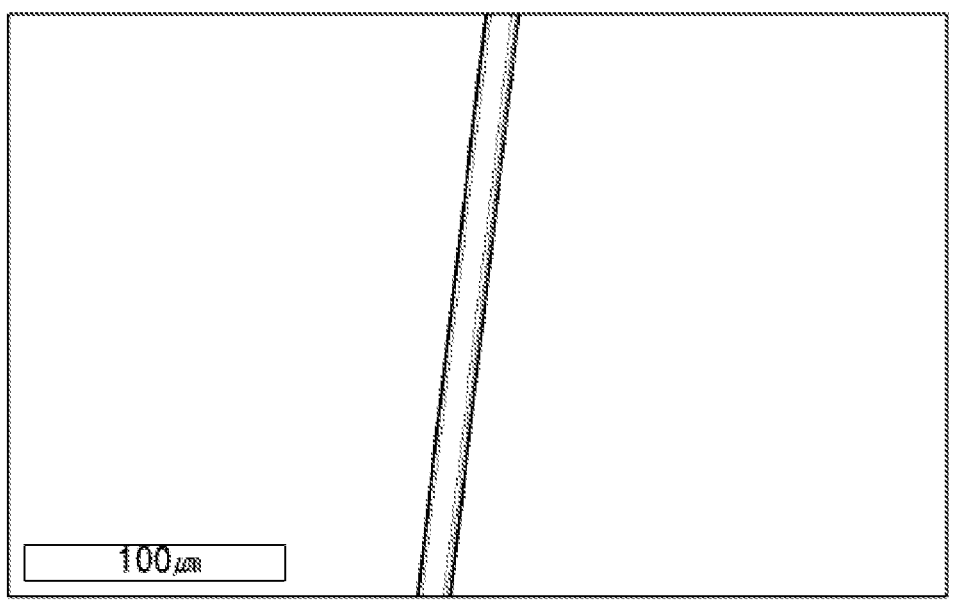
FIG. 12 is an image of an as-spun fiber from an AN-VIM-MA-AA quad-polymer made by a stretching method, with the fiber having a diameter of 20 mm.

As noted above, the thermal properties render the quad-polymers suitable to be melt-processable. For example, an AN-VIM-MA-AA quad-polymer precursor as described above was ground into coarse granules in a grinder. A Rosaland RH-7 capillary rheometer was used to extrude the fibers. In a typical trial, 11 g of copolymer was loaded in preheated rheometer in between 100 and 200° C. in atmospheric condition and left there to heat up for 10 minutes. Melted polymers passed through a die having a diameter within a range of 0.01-1.0 mm. A continuous fiber 901 was made by this method, where the fiber 901 is shown in FIG. 9 (with ruler 902 in FIG. 9 to provide scale). FIGS. 10 and 11 show as-spun fibers from and AN-VIM-MA-AA quad-polymer, which fibers have diameters of ~68 mm and ~25 mm, respectively. Also, for another method, the melted polymers were stretched under tension to get thinner fibers. FIG. 12 shows an as-spun fiber from AN-VIM-MA-AA quad-polymer made by a stretching method, which fiber has a diameter of diameters of 20 mm.

Annealing and Stabilization

Annealing or drawing is the step to align the polymer chains parallel to the fiber axis. This process is important to increase the fiber strength. Annealing and stabilization steps are done either together or separately.

Figure 13A:
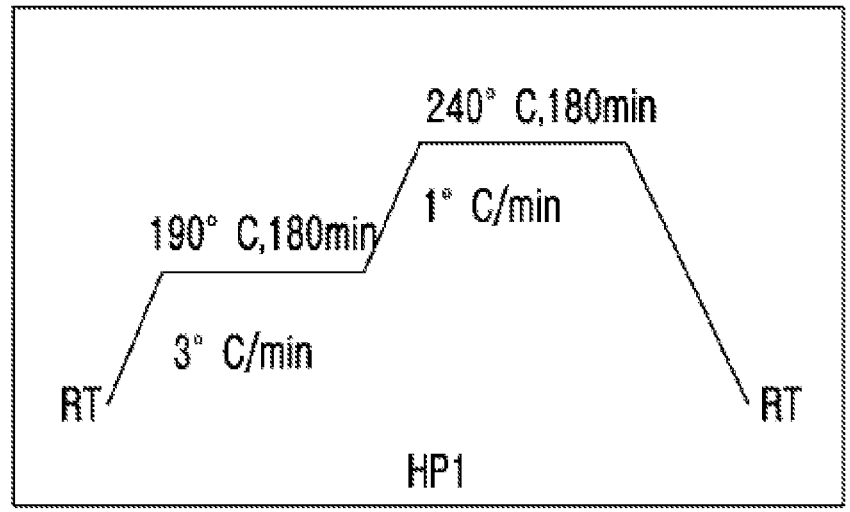
FIGS. 13A-13F are diagrams of heating programs of stabilization for embodiments of the present invention.
Figure 13B:
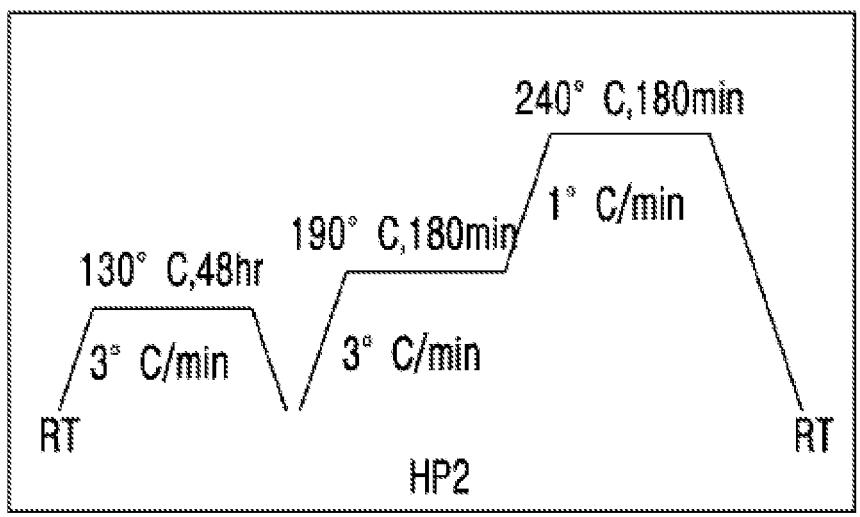
Figure 13C:
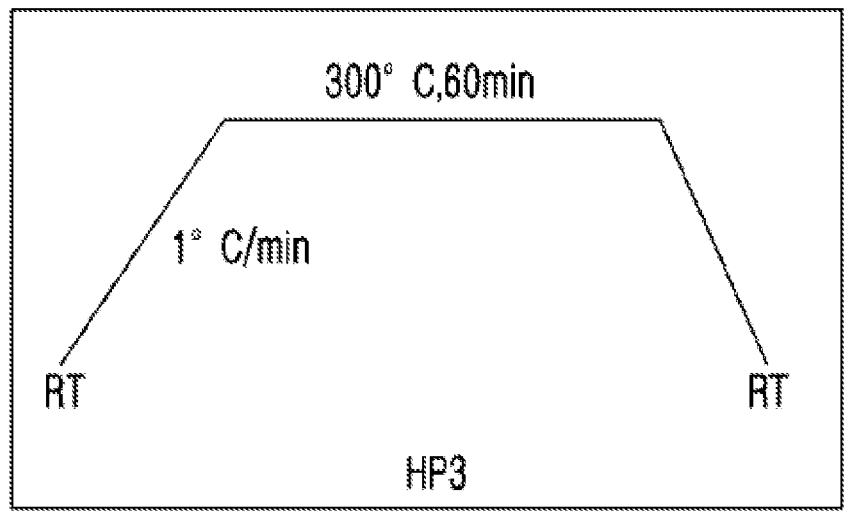
Figure 13D:
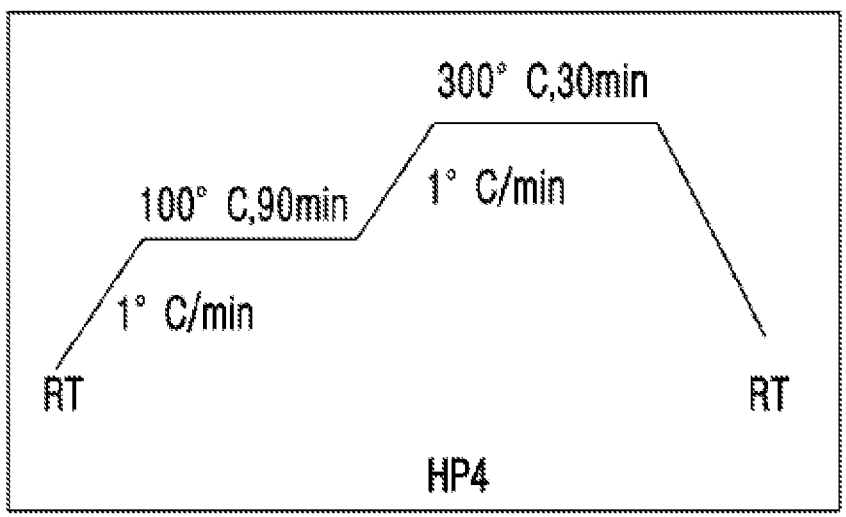
Figure 13E:
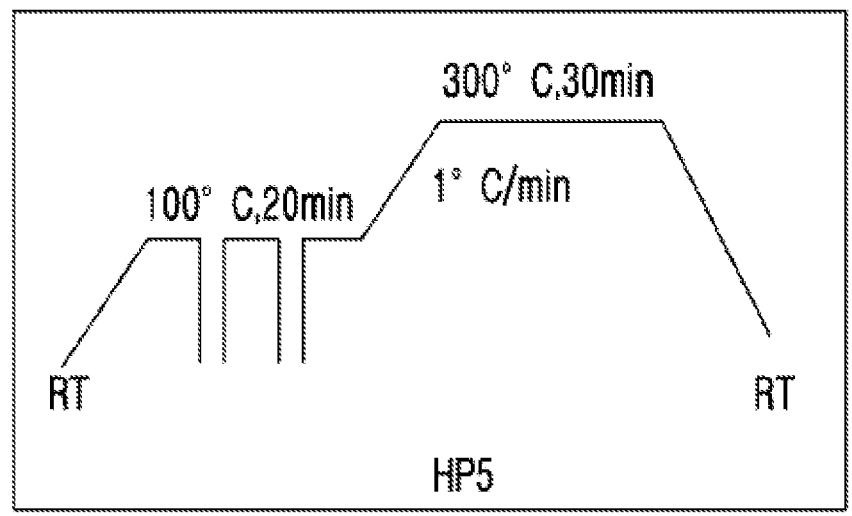
Figure 13F:
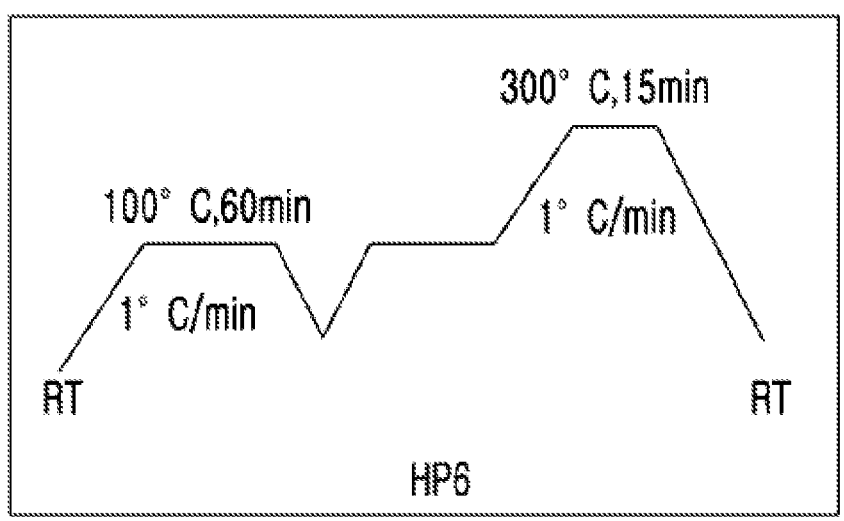

In heating program, HP1 (as shown in FIG. 13A), annealing and stabilization steps are done together and in HP2 (as shown in FIG. 13B), these are done separately. The fiber diameter is reduced up to 10-150% by the annealing stabilization process under applied tension.

Stabilization is the step of cyclization of the acrylonitrile groups. Heating programs of the stabilization step are shown in FIGS. 13A to 13F.

As shown in FIG. 13A, the first heating program, HP1, was set directly to 190° C. at a rate of 3° C. per minute and kept at that temperature for 180 minutes, then the temperature was raised to 240° C. at a rate of 1° C. per minute and kept at that temperature for another 180 minutes before cooled down to room temperature.

As shown in FIG. 13B, in HP2, the fibers were heated to 130° C. for 48 hours before repeating the same steps performed in HP1. It has been found from the experimentation and from the results, that the heating program HP2 worked best for forming stabilized fibers. Other heating programs HP3-HP6 are shown in FIGS. 13C to 13F. In all heating programs HP1-HP6, the fibers stabilized were performed with added tension of a weight at the end of the fiber during heating.

Figure 14:
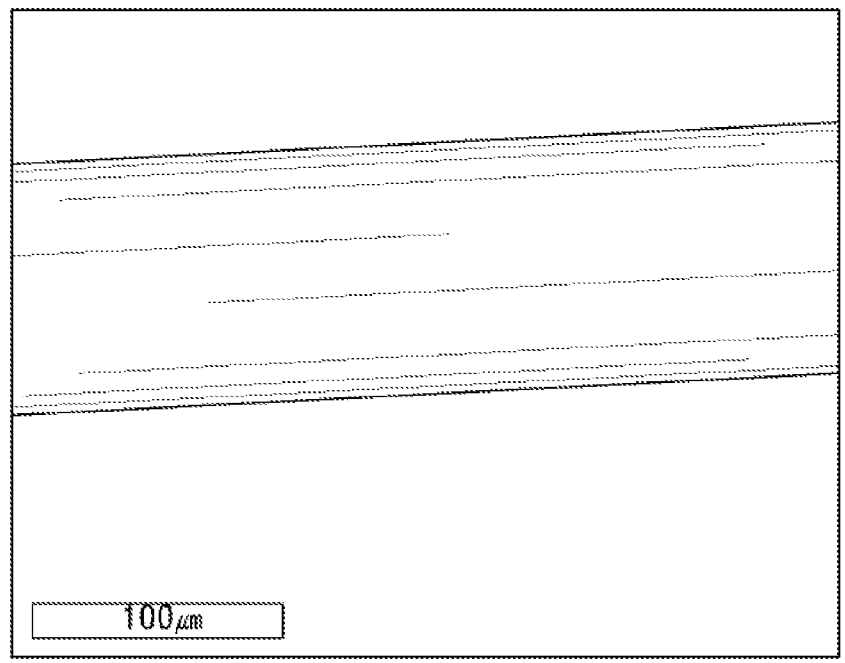
FIG. 14 is an image of a stabilized fiber made from an AN-VIM-MA-AA quad-polymer, with the fiber having a diameter of ~132 mm.

FIG. 14 shows an optical microscope photograph of a stabilized fiber made from an AN-VIM-MA-AA quad-polymer. The fiber had a diameter of ~132 mm.

Multi-Fiber Annealing and Stabilization

Figure 15:
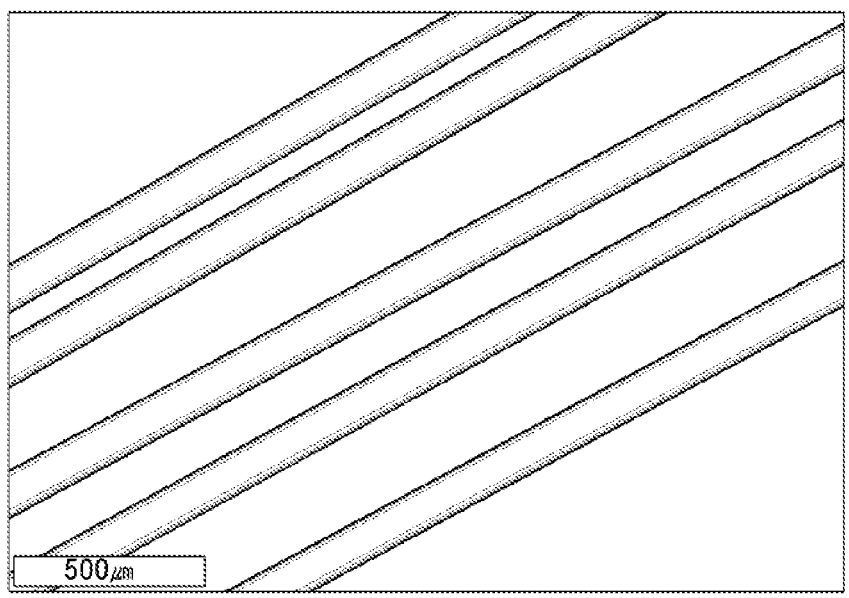
FIG. 15 is an image of stabilized multi fibers made from AN-VIM-MA-AA quad-polymer fibers where a tow of five fibers is stabilized together and none of the fibers fused together.

In another embodiment of the present invention, the stabilization of multi-filament in a tow of fiber is carried out without any melting or fusing of the fiber. FIG. 15 showed the result of this multi-fiber stabilization process, namely stabilized multi fibers made from AN-VIM-MA-AA quad-polymer fibers, where a tow of five fibers stabilized together and none of the fibers were fused together.

Such multi-fiber stabilization was a significant achievement. Previously, with the AN-VIM precursor (disclosed and taught in Yang '050 PCT Patent Application), this was not possible. However, with the quad-polymer precursors of the present invention, multi-fiber thermal stabilization has been successfully performed.

Carbonization

Thermally stabilized fibers may be used to make high strength carbon fiber by carbonization process under inert conditions. Both single precursor fiber and tow of the precursor fibers may be thermally stabilized and carbonized to yield carbon fibers.

Figure 16A:
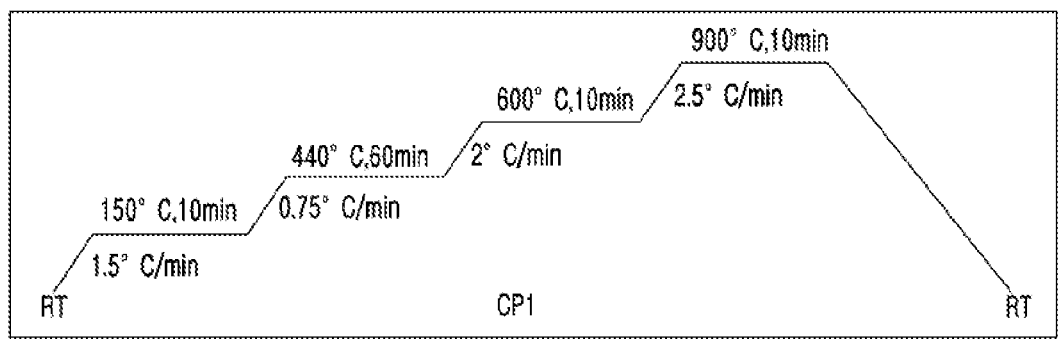
FIGS. 16A-16E are diagrams of heating programs of carbonization for embodiments of the present invention.
Figure 16B:
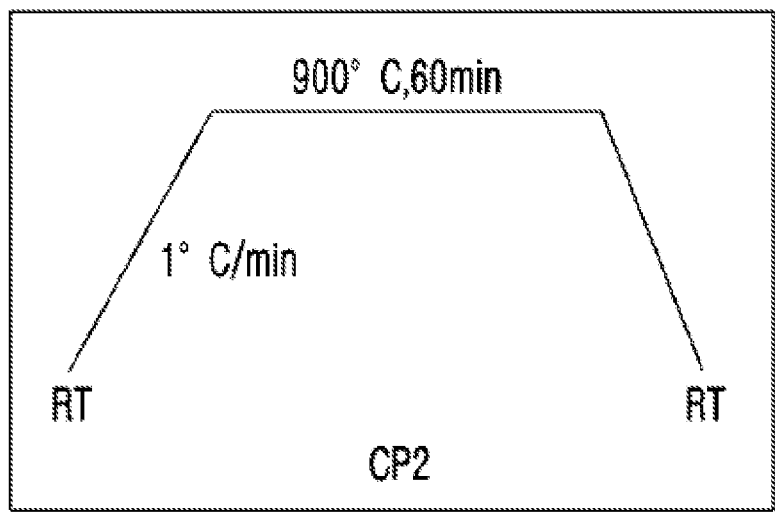
Figure 16C:
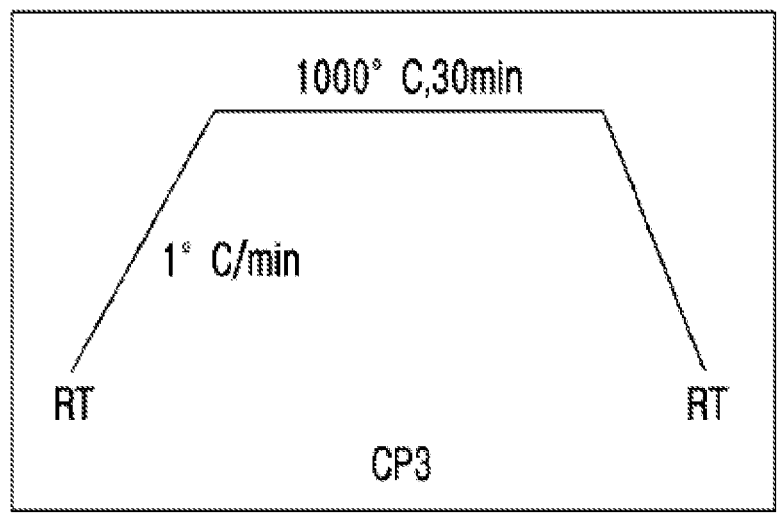
Figure 16D:
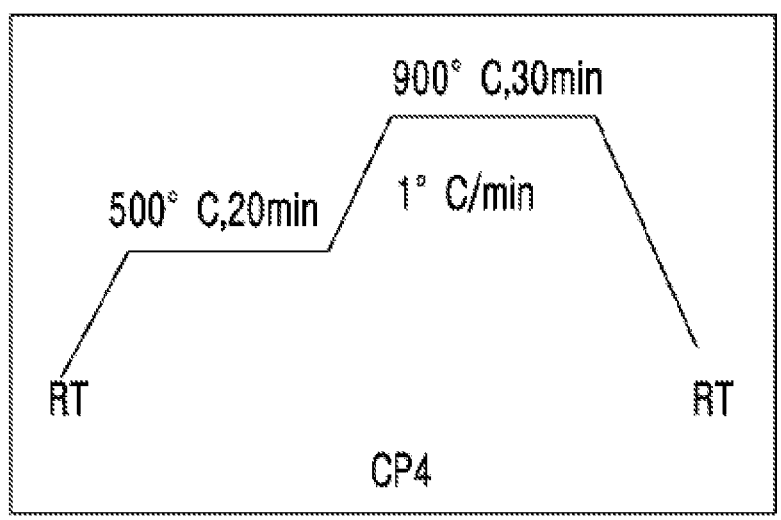
Figure 16E:
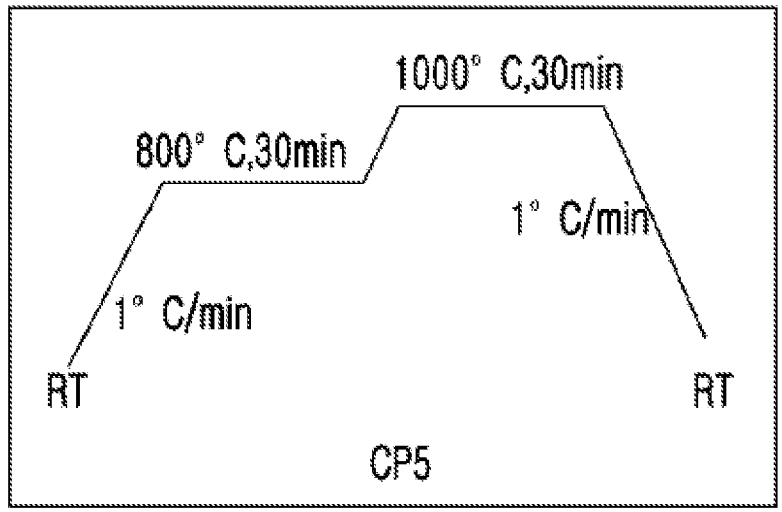

For example, a heating program of the carbonization step is shown in FIG. 16A (CP1). Carbonization is the last step in the formation of carbon fiber (which is carried out under inert condition), where the stabilized fiber is subjected to further heating. A typical heating program involves multiple steps (such as in CP1, which is shown in FIG. 16A). For instance, in the first step of CP1, the fiber is heated up to 150° C. at 1.5° C. per minute and held at that temperature for 10 minute, then the temperature is raised to 440° C. at a rate of 0.75° C. per minute, and held at that temperature for 60 minutes. The temperature is then raised to 600° C. at a rate of 2° C. per minute and kept at that temperature for 10 minutes before raised again to 900° C. at a rate of 2.5° C. per minute and held for 10 minutes. The carbonized fiber is then cooled down to room temperature.

Alternative heating programs of the carbonization step are shown in FIGS. 16B to 16E (CP2-CP5, respectively).

An AN-VIM-MA-AA quad-polymer was synthesized (using processes discussed and described above) and was extruded by using a single fiber extruder (rheometer), and the extruded fiber was then stabilized at 190° C. for 180 min followed by heating 240° C. at a step of 3° C. per minute, applying tension followed by a carbonization to produce a carbon fiber. The carbonization condition used was to heat the stabilized fiber in an oven under nitrogen atmosphere to reach the temperature at 900° C. in multiple steps (as shown in FIG. 16A (CP1)).

A carbon fiber of approximately 6 cm or 2.25 inch long was successfully prepared by carbonization of the stabilized fiber made from an AN-VIM-MA-AA copolymer.

Annealing, Stabilization, and Carbonization

In an embodiment of the present invention, for example, for a melt-extruded fiber with diameter within 338 mm when annealed and stabilized by following heating program HP2 (FIG. 13B), a stabilized fiber with a diameter of 86 mm may be made ("Example D"). Table 3 shows the properties of as-spun fiber vs. stabilized fiber.

TABLE 3

Melt spun fiber vs. stabilized fiber by following HP 2

| Fiber | TS | YM | Diameter |
|---|---|---|---|
| Melt spun | 109 MPa | 3890 MPa | 338 mm |
| Annealed | 163 MPa | 6645 MPa | 270 mm |
| Thermally Stabilized | 235 MPa | 183 GPa | 147 mm |

Figure 17:
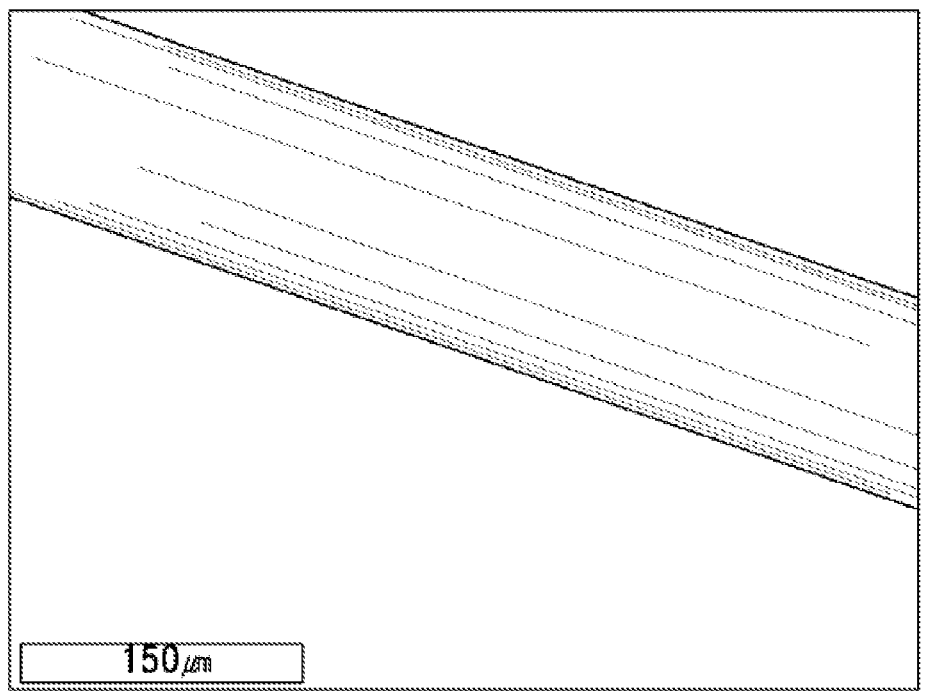
FIG. 17 is an image of a thermally stabilized fiber having a diameter of 147 μm.

FIG. 17 shows the thermally stabilized fiber having a diameter of 147 μm for Example D.

In an embodiment of the present invention, for example, for a melt-extruded fiber with a diameter within 168 mm when annealed and stabilized by following heating program HP1 (FIG. 13A) and carbonized by following carbonization heating program CP1 (FIG. 16A) ("Example E"), a carbon fiber with a diameter of 77 mm was made. Table 4 shows the properties of as-spun fiber vs. stabilized and carbonized fiber.

TABLE 4

Melt spun fiber vs. stabilized and carbonized fiber: stabilization by HP 1 and carbonization shown in FIG. 16A

| Fiber | TS | YM | Diameter |
|---|---|---|---|
| Melt spun | 192 MPa | 3092 MPa | 168 mm |
| Thermally Stabilized | 294 MPa | 7004 MPa | 136 mm |
| Carbonized | 894 MPa | 220 GPa | 77 mm |

Figure 18:
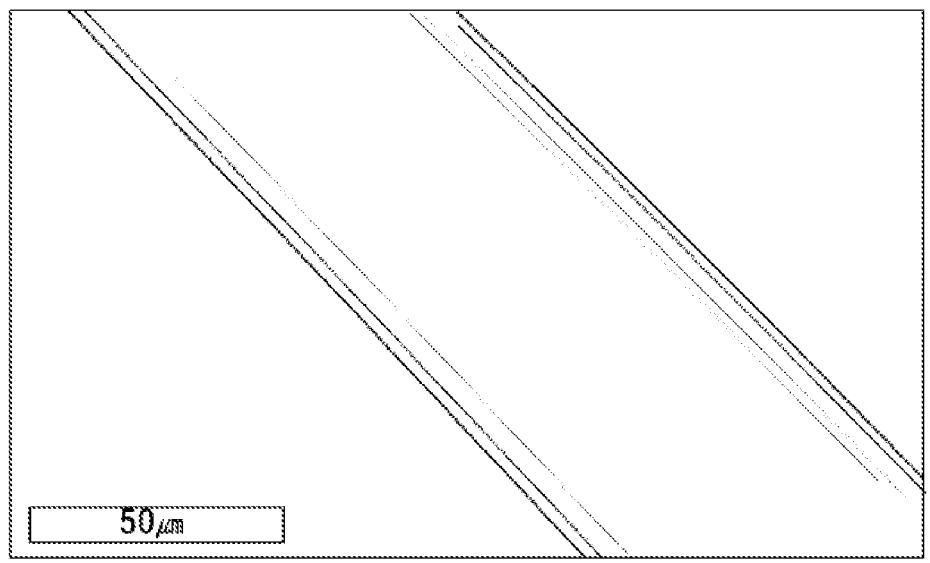
FIG. 18 is an optical image of a carbon fiber made from the AN-VIM-MA-AAquad-polymer.
Figure 19:
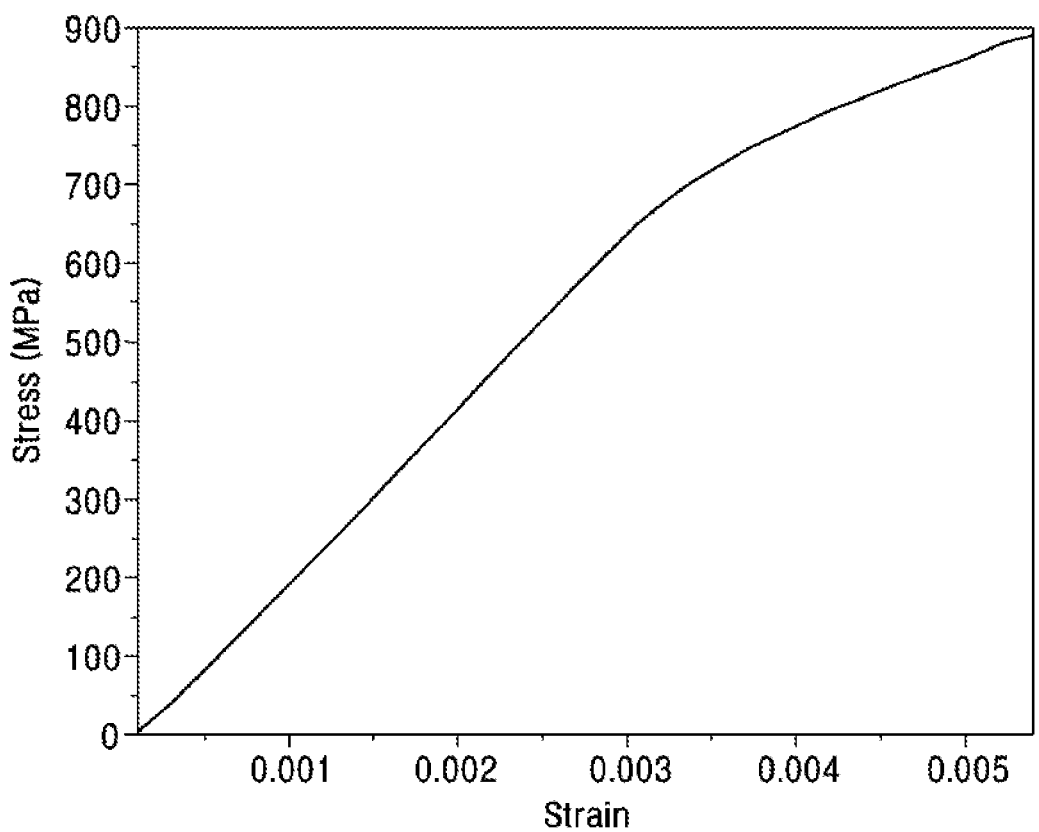
FIG. 19 is a graph showing the stress-strain curve of the carbon fiber shown in FIG. 18.

FIG. 18 shows the carbon fiber of Example E having a diameter of 77 μm. FIG. 19 shows the results of an Instron measurement test done with the carbon fiber of Example E. The fiber yielded a tensile strength (TS) of approximately 894 MPa and a Young's Modulus (YM) of 220 GPa.

General Synthesis of AN-VIM-MA-IA Quad-Polymer

Figure 20:
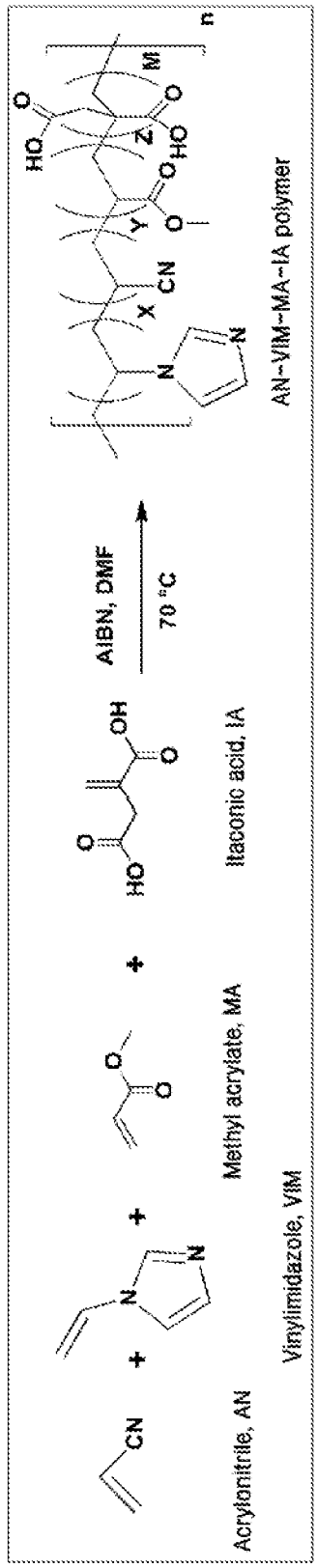
FIG. 20 shows a synthesis scheme of an AN-VIM-MA-IA quad-polymer precursor by free radical polymerization.

As noted above, in embodiments of the present invention, the fourth components may be itaconic acid (IA) instead of acrylic acid (AA). The free radical solution polymerization of AN, VIM, MA and IA monomers was carried out in 250-2000 mL flasks fitted with a thermocouple probe, a condenser, an addition funnel and a nitrogen inlet. The flask was charged with DMF and purged with nitrogen for 30 minutes. Then, the monomers, AIBN and chain transfer agent, 1-dodecanethiol were added drop wise into the flask over a period of 2-8 hours. The polymerization reactions were carried out at 70° C. with continuous stirring overnight. The polymers were precipitated in de-ionized water, filtered and washed with methanol and hexane to remove residual monomers and then dried in a vacuum oven for two days till constant weight was obtained. FIG. 20 illustrates a scheme of the solution polymerization of AN, VIM, MA and IA.

Figure 21:
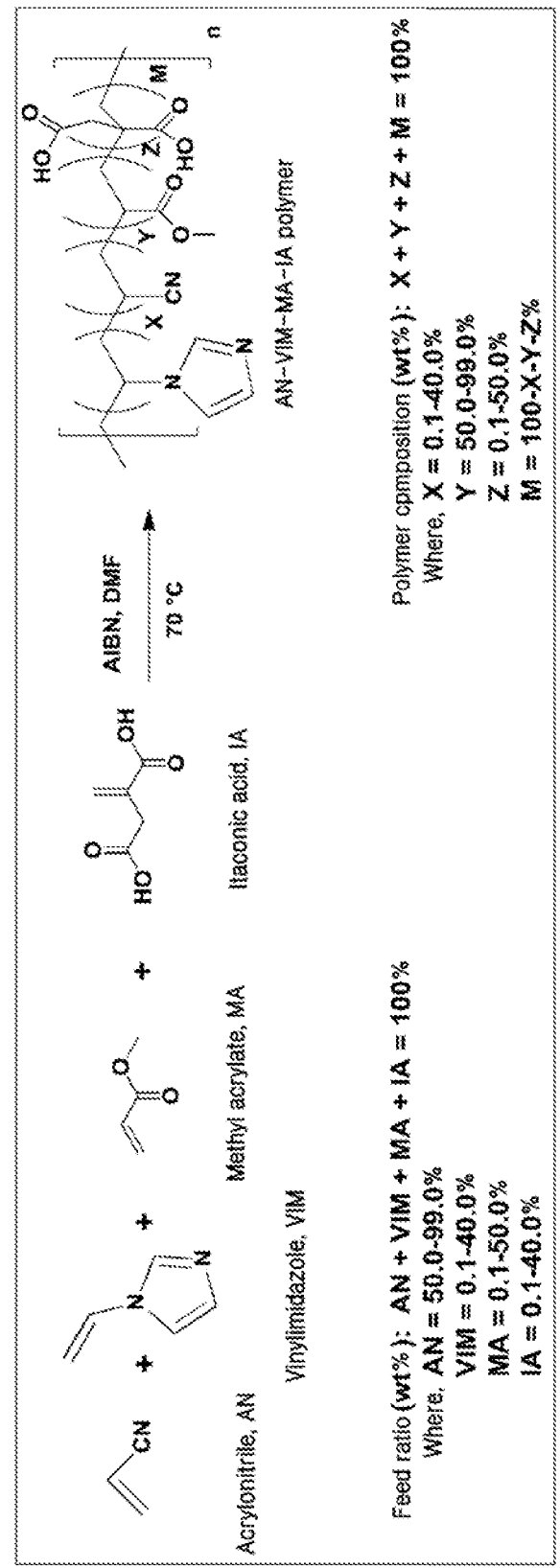
FIG. 21 shows the AN-VIM-MA-IA quad-polymer synthesis scheme, including a first range of ratios of monomers (by wt %) in the feed and resulting polymers.

The monomers in the AN-VIM-MA-IA quad-polymer may be present in any suitable ratio in the quad-polymer. For example, if four monomers AN, VIM, MA and IA are used, the resulting quad-polymer may have a range of weight ratios of AN:VIM:MA:IA, such that the total amount of the monomers adds up to 100% in wt %. In certain embodiments of the present invention, the amount of each monomer in the feed and product of a quad-polymer varies from as shown in FIG. 21. Specifically, these are as follows:

Feed ratios (wt %): AN+VIM+MA+IA=100%, where

AN=50.0-99.0 wt %

VIM=0.1-40.0 wt %

MA=0.1-50.0 wt %

IA=0.1-40.0 wt % and the product (AN-VIM-MA-IA polymer) has the following chemical formula

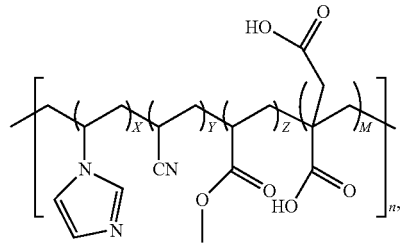

with polymer composition (wt %): X+Y+Z+M=100%, where

X=0.1-40.0 wt %

Y=50.0-99.0 wt %

Z=0.1-50.0 wt %

M=100-X-Y-Z %.

In certain embodiments, more preferably, the amount of each monomer in the feed and product of a quad-polymer varies as follows:

Feed ratios (wt %): AN+VIM+MA+IA=100%, where

AN=60.0-95.0 wt %

VIM=0.1-10.0 wt %

MA=2.5-30.0 wt %

IA=0.1-10.0 wt %, and the product (AN-VIM-MA-IA polymer) has the following chemical formula

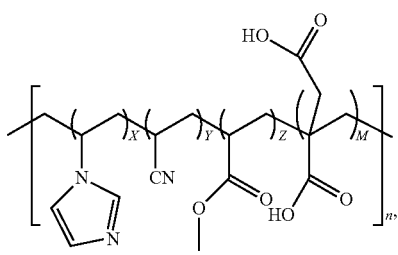

with polymer composition (wt %): X+Y+Z+M=100%, where
X=0.1-10.0 wt %
Y=60.0-95.0 wt %
Z=2.5-30.0 wt %
M=100-X-Y-Z %.

In certain embodiments, most preferably, the amount of each monomer in the feed and product of a quad-polymer varies as follows:
Feed ratios (wt %): AN+VIM+MA+IA=100%, where
AN=70.0-92.5 wt %
VIM=0.1-5.0 wt %
MA=2.5-25.0 wt %
IA=0.1-5.0 wt %,
and the product (AN-VIM-MA-IA polymer) has the following chemical formula

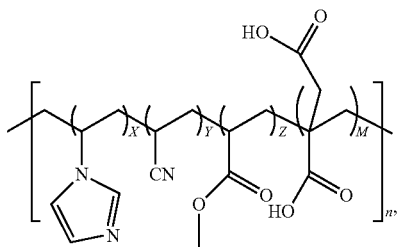

with polymer composition (wt %): X+Y+Z+M=100%, where
X=0.1-5.0 wt %
Y=70.0-92.5 wt %
Z=2.5-25.0 wt %
M=100-X-Y-Z %.

ADDITIONAL/ALTERNATIVE EMBODIMENTS

In additional embodiments: the second monomer (N-vinylimidazole) may be, alternatively, 4-vinylimidazole, 2-vinylimidazole or 1-methyl-2-vinylimidazole; the third monomer (methyl acrylate) may be, alternatively, ethyl acrylate, butyl acrylate, methyl methacrylate, or tert-butyl acrylate; and the fourth monomer (acrylic acid or itaconic acid) may be, alternatively, methacrylic acid.

The invention claimed is:

1. A method for forming fibers of quad-polymers comprising (a) a first monomer that is acrylonitrile, (b) a second monomer that is selected from a group consisting of 1-vinylimidazole, 4-vinylimidazole, 2-vinylimidazole, and 1-methyl-2-vinylimidazole, (c) a third monomer that is selected from a group consisting of methyl acrylate, ethyl acrylate, butyl acrylate, methyl methacrylate, and tert-butyl acrylate, and (d) a fourth monomer that is an acid and is selected from a group consisting of acrylic acid, itaconic acid, and methacrylic acid, wherein the method includes the steps of:

(i) combining the first monomer, the second monomer, the third monomer, and the fourth monomer to form the quad-polymer composition; and (ii) melt-spinning the quad-polymer composition to form fibers of the quad-polymer composition.

* * * * *